United States Patent
Abraham et al.

(10) Patent No.: US 12,102,084 B2
(45) Date of Patent: Oct. 1, 2024

(54) PROCESSES FOR THE PREPARATION OF TREATED SEEDS

(71) Applicant: Monsanto Technology LLC, St. Louis, MO (US)

(72) Inventors: William Abraham, Wildwood, MO (US); Gulam Ahmed, Ballwin, MO (US); Shaun Raj Selness, Chesterfield, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 1156 days.

(21) Appl. No.: 16/646,349

(22) PCT Filed: Sep. 12, 2018

(86) PCT No.: PCT/US2018/050591
§ 371 (c)(1),
(2) Date: Mar. 11, 2020

(87) PCT Pub. No.: WO2019/055470
PCT Pub. Date: Mar. 21, 2019

(65) Prior Publication Data
US 2020/0275648 A1 Sep. 3, 2020

Related U.S. Application Data

(60) Provisional application No. 62/557,230, filed on Sep. 12, 2017.

(51) Int. Cl.
| | |
|---|---|
| A01N 25/00 | (2006.01) |
| A01N 25/10 | (2006.01) |
| A01N 43/16 | (2006.01) |
| A01N 63/20 | (2020.01) |
| A01N 63/30 | (2020.01) |
| A01N 63/34 | (2020.01) |
| A01N 63/38 | (2020.01) |
| A01N 65/08 | (2009.01) |

(52) U.S. Cl.
CPC ............. *A01N 25/00* (2013.01); *A01N 25/10* (2013.01); *A01N 63/20* (2020.01); *A01N 63/30* (2020.01); *A01N 63/34* (2020.01); *A01N 63/38* (2020.01); *A01N 43/16* (2013.01); *A01N 65/08* (2013.01)

(58) Field of Classification Search
None
See application file for complete search history.

(56) References Cited

U.S. PATENT DOCUMENTS

| | | |
|---|---|---|
| 4,536,207 A | 8/1985 | Mccandliss et al. |
| 4,583,320 A | 4/1986 | Redenbaugh |
| 4,779,376 A | 10/1988 | Redenbaugh |
| 4,779,379 A | 10/1988 | Redenbaugh |
| 5,702,752 A | 12/1997 | Gugger et al. |
| 5,965,545 A | 10/1999 | Ben-Shalom et al. |
| 5,990,291 A | 11/1999 | Waggle et al. |
| 6,146,668 A | 11/2000 | Kelly et al. |
| 8,614,165 B2 | 12/2013 | Goodwin |
| 2012/0015805 A1 | 1/2012 | Goodwin |
| 2014/0106964 A1 | 4/2014 | Jogikalmath et al. |
| 2015/0156982 A1 | 6/2015 | Spangenberg et al. |
| 2016/0249620 A1 | 9/2016 | Wang |

FOREIGN PATENT DOCUMENTS

| | | |
|---|---|---|
| WO | 2005063784 A1 | 7/2005 |
| WO | 2007117500 A2 | 10/2007 |
| WO | 2008071674 A2 | 6/2008 |
| WO | 2010049751 A1 | 5/2010 |
| WO | 2015066153 A1 | 5/2015 |
| WO | 2017087939 A1 | 5/2017 |
| WO | WO2017/087939 | 5/2017 |
| WO | WO2019/232049 | 12/2019 |

OTHER PUBLICATIONS

"Encapsulation of Plant Growth-Promoting Bacteria in Alginate Beads Enriched With Humic Acid"; Young et al.; Wiley Publications 2006; published online Apr. 17, 2006; 8 pgs.

Cottaz, S., et al., "Genetic Engineering of *Escherichia coli* for the Production of NI, NII-diacetylchitobiose (chitinbiose) and its Utilization as a Primer for the Synthesis of Complex Carbohydrates," 2005, Metabolic Eng, 7/4:311-317, 7 pages.

D'haeze, W., et al., "Nod Factor Structures, Responses, and Perception During Initiation of Nodule Development," 2002, Glycobiology, 12/6:79R-105R, 27 pages.

Demont-Caulet, N., et al., "Nodule-Inducing Activity of Synthetic Sinorhizobium Meliloti Nodulation Factors and Related Lipo-Chitooligosaccharides on Alfalfa. Importance of the Acyl Chain Structure," 1999, Plant Physiol, 120/1:83-92, 10 pages.

Hamel, L.P., et al., "Chitooligosaccharide Sensing and Downstream Signaling: Contrasted Outcomes in Pathogenic and Beneficial Plant-Microbe Interactions," 2010, Planta, 232/4:787-806, Abstract Only, 1 page.

Jain, V., et al., "Plant Flavonoids: signals to Legume Nodulation and Soil Microorganisms," 2002, J. Plant Biochem. & Biotechnol. 11:1-10, 10 Pages.

Mabood, F., et al., "Jasmonates Induce Nod Factor Production by Bradyrhizobium Japonicum," 2006, Plant Physiol. Biochem. 44/11:759-765, Abstract Only, 1 page.

Mabood, F., et al., "Bradyrhizobium Japonicum Preincubated with Methyl Jasmonate Increases Soybean Nodulation and Nitrogen Fixation," 2006, Plant Agr. J. 982:289-294, Abstract Only, 1 page.

Mabood, F., et al., "Methyl Jasmonate, Alone or in Combination with Genistein, and Bradyrhizobium Japonicum Increases Soybean (*Glycine max* L.) Plant Dry Matter Production and Grain Yield Under Short Season Conditions," 2006, Plant Field Crops Res., 95/2-3:412-419, Abstract Only, 1 page.

(Continued)

*Primary Examiner* — John Pak
(74) *Attorney, Agent, or Firm* — Harness, Dickey & Pierce, P.L.C.

(57) ABSTRACT

Provided herein are treated seeds and methods for the preparation of treated seeds comprising a biological agent and a polymeric coating.

21 Claims, 6 Drawing Sheets

(56) References Cited

OTHER PUBLICATIONS

Müller, J., et al., "Nod Factors and Chitooligomers Elicit and Increase in Cytosolic Calcium in Aequorin-Expressing Soybean Cells," 2000, Plant Physiol., 124:733-739, 7 pages.

Pochanavanich, P., et al., "Fungal Chitosan Production and Its Characterization," 2002, Lett. Appl. Microbiol. 35:17-21, 5 pages.

Ralston, L., et al., "Partial Reconstruction of Flavonoid and Isoflavonoid Biosynthesis in Yeast Using Soybean Type I and Type II Chalcone Isomerases," 2005, Plant Physiol. 137:1375-1388, 14 pages.

Robina, I., et al., "Synthesis and Biological Evaluation of Oligosaccharides Related to the Molecule Signals in Plant Defence and the Rhizobium-Legume Symbiosis," 2002, Tetrahedron, 58:521-530, 10 pages.

Rougé, P., et al., "Chapter 27: Docking of Chitin Oligomers and Nod Factors on Lectin Domains of the LysM-RLK Receptors in the Medicago-Rhizobium Symbiosis," 2011, The Molecular Immunology of Complex Carbohydrates-3, Springer Science, pp. 511-521, 11 pages.

Samain, E., et al., "Gram-scale Synthesis of Recombinant Chitooligosaccharides in *Escherichia coli*," 1997, Carbohydrate Res. 302:35-42, 8 pages.

Samain, E., et al., "Production of O-acetylated and Sulfated Chitooligosaccharides by Recombinant *Escherichia coli* Strains Harboring Different Combinations of Nod Genes," 1999, J. Biotechnol., 72:33-47, 15 pages.

Shaw, L.J., et al., "Perception and Modification of Plant Flavonoid Signals by Rhizosphere Microorganisms," 2006, Environ. Microbiol. 8/11:1867-1880, 14 pages.

Spaink, H.P., "Root Nodulation and Infection Factors Produced by Thizobial Bacteria," 2000, Annu Rev Microbiol, 54:257-288, 34 pages.

Van der Holst, P, PG., et al., "Proteins Involved in the Production and Perception of Oligosaccharides in Relation to Plant and Animal Devlopment," 2001, Curr. Opin. Struc. Biol. 11:608-616, 9 pages.

Wang, X., et al., "Genome-Wide and Organ-Specific Landscapes of Epigenetic Modifications and Their Relationships to mRNA and Small RNA Transcriptomes in Maize," 2009, Plant Cell 21:1053-1069, 18 pages.

Cross Linking Polymers—Alginate Worms, Index 3.1.9, RCS Advancing the Chemical Sciences.

International Search Report and Written Opinion issued Nov. 19, 2018 in PCT/US2018/050591, 4 pages.

| Total Treatments | Trt ID | Reps | Treatment Description | Treatment Type |
|---|---|---|---|---|
| 1 | NBP-1 | 1 | Inoculant Only | Control |
| 2 | | 2 | | |
| 3 | | 3 | | |
| 4 | NBP-2 | 1 | Inoculant + Sugar-based Extender | Control |
| 5 | | 2 | | |
| 6 | | 3 | | |
| 7 | NBP-3 | 1 | Inoculant + Sugar-based Extender + $CaCl_2$ | Control |
| 8 | | 2 | | |
| 9 | | 3 | | |
| 10 | NBP-4 | 1 | Inoculant + $CaCl_2$ | Control |
| 11 | | 2 | | |
| 12 | | 3 | | |
| 13 | NBP-5 | 1 | Inoculant + 5% alginate + Sugar-based Extender | Control |
| 14 | | 2 | | |
| 15 | | 3 | | |
| 16 | NBP-6 | 1 | Inoculant + 5% alginate | Control |
| 17 | | 2 | | |
| 18 | | 3 | | |
| 19 | NBP-7 | 1 | Inoculant + Sugar-based Extender +2% Alginate + $CaCl_2$ | Sample |
| 20 | | 2 | | |
| 21 | | 3 | | |
| 22 | NBP-8 | 1 | Inoculant + Sugar-based Extender + 3.5% Alginate + $CaCl_2$ | Sample |
| 23 | | 2 | | |
| 24 | | 3 | | |
| 25 | NBP-9 | 1 | Inoculant + Sugar-based Extender + 5% Alginate + $CaCl_2$ | Sample |
| 26 | | 2 | | |
| 27 | | 3 | | |

Fig. 4

| Total Treatments | Alginate Method | Trt ID | Replicates | Treatment Description | Treatment Type |
|---|---|---|---|---|---|
| 1 | Method 1 (2% Alginate) | NBP-1 | 1 | Chemistry only | Control |
| 2 | | | 2 | | |
| 3 | | | 3 | | |
| 4 | | NBP-2 | 1 | Chemistry + Polymer Precise 1010 | Control |
| 5 | | | 2 | | |
| 6 | | | 3 | | |
| 7 | | NBP-3 | 1 | Chemistry + Polymer Florite 1197 | Control |
| 8 | | | 2 | | |
| 9 | | | 3 | | |
| 10 | | NBP-4 | 1 | Chemistry + 6%CaCl$_2$ | Control |
| 11 | | | 2 | | |
| 12 | | | 3 | | |
| 13 | | NBP-5 | 1 | Chemistry + 2% alginate | Control |
| 14 | | | 2 | | |
| 15 | | | 3 | | |
| 16 | | NBP-6 | 1 | Chemistry + 2% alginate + 6% CaCl$_2$ | Sample |
| 17 | | | 2 | | |
| 18 | | | 3 | | |
| 19 | Method 2 (3.5% alginate) | NBP-7 | 1 | Chemistry + 3.5% alginate | Control |
| 20 | | | 2 | | |
| 21 | | | 3 | | |
| 22 | | NBP-8 | 1 | Chemistry + 3.5% alginate + 6% CaCl$_2$ | Sample |
| 23 | | | 2 | | |
| 24 | | | 3 | | |
| 25 | Method 3 (5% alginate) | NBP-9 | 1 | Chemistry + 5% alginate | Control |
| 26 | | | 2 | | |
| 27 | | | 3 | | |
| 28 | | NBP-10 | 1 | Chemistry + 5% alginate + 6% CaCl$_2$ | Sample |
| 29 | | | 2 | | |
| 30 | | | 3 | | |

Fig. 5

|  | Actives | mL/kg of seed | Actives loading | Order of addition | Time of addition (Seconds) |
|---|---|---|---|---|---|
| CRUISERMAX Advanced | Mefenoxam | 202 | 11.3 µg/seed | 1 | 0-5 |
| | Fludioxonil | | 3.8 µg/seed | 1 | |
| | Thiamethoxam | | 75.6 µg/seed | 1 | |
| Color red + Florite 1197 blend | | 163 | | 1 | 0-5 |
| Alginate Solution | | 196 | up to 15 µg/seed | 1 | 0-5 |
| 6 - 10% $CaCl_2$ Solution | | 196 | up to 30 µg/seed | 2 | 10-15 |
| Homogenization (End of treatment) | | | | | 40 |

Fig. 6

PROCESSES FOR THE PREPARATION OF TREATED SEEDS

REFERENCE TO RELATED APPLICATIONS

The present application is the 371 National Stage Application of International Patent Application Serial No. PCT/US2018/050591, filed Sep. 12, 2018, which claims the benefit of U.S. Provisional Application Ser. No. 62/557,230, filed Sep. 12, 2017, the entire contents of which are incorporated herein by reference.

FIELD OF THE INVENTION

Provided herein are treated seeds and processes for the preparation of treated seeds.

BACKGROUND

Seed treatments can be used to apply a variety of agronomically important chemistries (e.g., agrochemicals that are useful to improve the agronomic characteristics of the seed and/or a plant grown from the seed) to seeds.

Many seed treatments applied as coatings impart stickiness and/or tackiness to the seed surface. These surface characteristics can interfere with the flow of the seeds through industrial manufacturing and distribution equipment, which increases complexity and expense for the seed producer and the seed or seed treatment dealer. For the same reason, seed treatments can also impede the flow of the seeds through planting equipment, which can result in planting errors and, ultimately, in lower crop yields.

It is therefore desirable to develop methods for the preparation of treated seeds having good flowability through manufacturing, distribution, and planting equipment.

In addition, treated seeds are often exposed to harsh environmental conditions, such as high temperatures or high humidity, that occur during the seed treatment process or in the context of distributing, storing, or planting the treated seeds. In some instances, exposure to environmental conditions can decrease the lifespan and activity of active ingredients that are incorporated into the seed coating.

It is therefore desirable to develop methods for the preparation of treated seeds wherein the active ingredients maintain activity over an extended lifespan under producing, planting, and storage conditions.

SUMMARY

A method of producing a treated seed is provided, the method comprising applying a first seed treatment composition comprising an anionic polymer and a biological agent to a seed, thereby producing a wetted seed; and subsequently spraying the wetted seed with a second seed treatment composition comprising one or more polyvalent cations, thereby producing a treated seed having a polymeric coating.

A treated seed is provided, wherein the seed is produced using a method as described herein.

Other objects and features will be in part apparent and in part pointed out hereinafter.

BRIEF DESCRIPTION OF THE DRAWINGS

FIG. 4 is a table providing a sample treatment list for a single non-spore former microbe strain as described in Example 1 where the treatments were repeated for each strain.

FIG. 5 is a table providing an example of a treatment list for a single non-spore former microbe strain as described in Example 3 where the treatment procedures were repeated for all three strains.

FIG. 6 is a table providing details regarding commercial products containing insecticides and fungicides used along with a polymer for a seed treatment as described in Example 5.

Corresponding reference characters indicate corresponding parts throughout the drawings.

DETAILED DESCRIPTION

Figure 1:
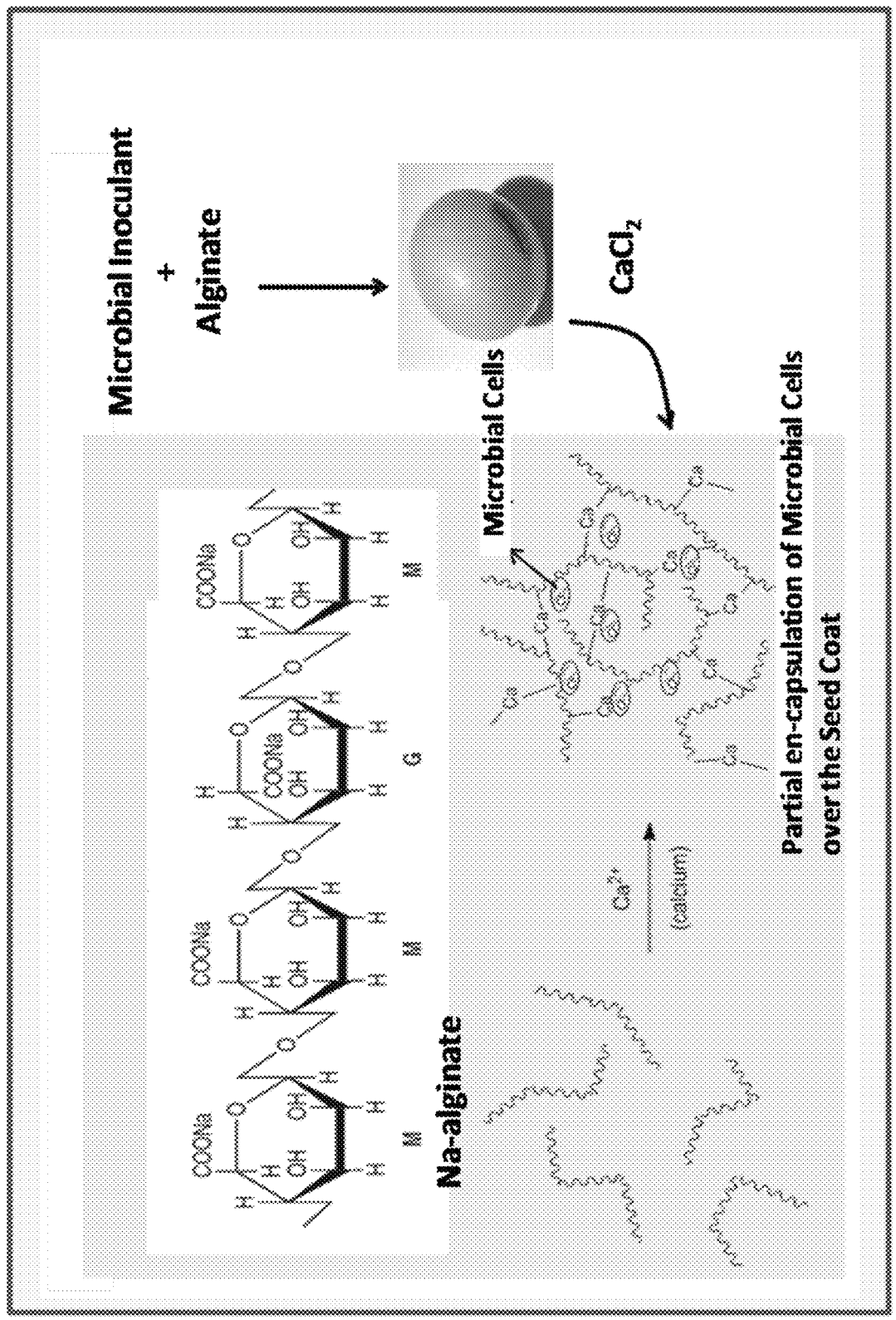
FIG. 1 depicts an exemplary process wherein a seed is treated with a microbial inoculant, sodium alginate, and calcium chloride.

Provided herein are processes for the preparation of treated seeds. Various embodiments of the process may enable the production of treated seeds having good handling properties, desirable visual characteristics, lifespan or activity of active ingredients, or a combination thereof.

In one embodiment, the process described herein comprises contacting a seed with a first seed treatment composition comprising an anionic polymer and a biological agent or an agrochemical, thereby producing a wetted seed.

In some embodiments, the process further comprises contacting the wetted seed with a second seed treatment composition comprising one or more polyvalent cations, thereby producing a treated seed.

In some embodiments, when the wetted seed is contacted with the second seed treatment composition, the polyvalent cations react with the anionic polymer to initiate a crosslinking process that results in the formation of a polymeric film in situ on the surface of the seed. The polymeric coating produced by this process is substantially uniform, and provides a number of desirable characteristics including enhanced flowability, improved plantability, and reduction of dust-off.

In some instances, active ingredients incorporated into the polymeric coating may exhibit improved activity, an extended lifespan, or a combination thereof. In the processes described herein, active ingredients incorporated into the first seed treatment composition (e.g., biological agents or agrochemicals) are present on the surface of the seed during the in situ crosslinking process, and may in some embodiments become at least partially encapsulated in the pores of the resulting polymer. Without being bound to a particular theory, it is believed that the active ingredients at least partially encapsulated within the uniform polymeric coating are better protected from environmental conditions, such as those that may occur during drying, transportation, or storage of the treated seeds, and may therefore exhibit improved lifespan and activity.

As used herein, the term "wetted seed" refers to a seed that has been contacted with a first seed treatment composition as described herein. The first seed treatment composition may be an aqueous composition or a non-aqueous composition.

As used herein, the term "treated seed" refers to a seed that has been contacted with a first seed treatment composition and a second seed treatment composition as described herein.

First Seed Treatment Composition

In the processes described herein, the first seed treatment composition comprises one or more biological agents and/or agrochemicals and anionic polymer. Non-limiting examples of useful biological agents include bacteria, fungi, beneficial nematodes, and viruses. Non-limiting examples of useful agrochemicals include pesticides, including fungicides, herbicides, insecticides, and nematicides.

1. Biological Agents

In certain embodiments, the biological agent comprises a gram negative bacterium. For example, the biological agent can comprise a bacterium of the genus Actinomycetes, *Agrobacterium, Arthrobacter, Alcaligenes, Aureobacterium, Azobacter, Bacillus, Beijerinckia, Bradyrhizobium, Brevibacillus, Burkholderia, Chromobacterium, Clostridium, Clavibacter, Comamonas, Corynebacterium, Curtobacterium, Enterobacter, Flavobacterium, Gluconobacter, Hydrogenophaga, Klebsiella, Methylobacterium, Paenibacillus, Pasteuria, Photorhabdus, Phyllobacterium, Pseudomonas, Rhizobium, Serratia, Sphingobacterium, Stenotrophomonas, Streptomyces, Variovorax,* or *Xenorhabdus*. In particular embodiments the bacteria is selected from the group consisting of *Bacillus amyloliquefaciens, Bacillus cereus, Bacillus firmus, Bacillus licheniformis, Bacillus pumilus, Bacillus sphaericus, Bacillus subtilis, Bacillus thuringiensis, Bradyrhizobium japonicum, Bradyrhizobium elkini, Bradyrhizobium diazoefficiens, Chromobacterium subtsugae, Pasteuria nishizawae, Pasteuria penetrans, Pasteuria usage, Pseudomonas fluorescens,* and *Streptomyces lydicus.*

In certain embodiments the biological agent can comprise a fungus of the genus *Alternaria, Ampelomyces, Aspergillus, Aureobasidium, Beauveria, Colletotrichum, Coniothyrium, Gliocladium, Metarhizium, Muscodor, Paecilomyces, Penicillium, Trichoderma, Typhula, Ulocladium,* and *Verticillium*. In particular embodiments the fungus is *Beauveria bassiana, Coniothyrium minitans, Gliocladium virens, Muscodor albus, Paecilomyces lilacinus, Penicillium bilaiae, Trichoderma asperellum, Trichoderma polysporum,* or *Trichoderma virens.*

In some embodiments, the first seed treatment composition comprises a bacterium of the genus *Bradyrhizobium.*

In some embodiments, the first seed treatment composition comprises a bacterium of the genus *Pseudomonas.*

2. Agrochemicals

In certain embodiments, the agrochemical agent comprises any suitable pesticide(s), including, but not limited to, fungicides, herbicides, insecticides, and nematicides. In some embodiments, the first seed treatment composition described herein comprises one or more agrochemicals.

The first seed treatment compositions described herein may comprise any suitable insecticide(s), including, but not limited to, biological insecticides and chemical insecticides. Insecticides may be selected so as to provide effective control against a broad spectrum of insects, including, but not limited to, insects from the orders Coleoptera, Dermaptera, Diptera, Hemiptera, Homoptera, Hymenoptera, Lepidoptera, Orthoptera and Thysanoptera. For example, the first and/or second seed treatment compositions described herein may comprise one or more insecticides toxic to insects from the families Acrididae, Aleytodidae, Anobiidae, Anthomyiidae, Aphididae, Bostrichidae, Bruchidae, Cecidomyiidae, Cerambycidae, Cercopidae, Chrysomelidae, Cicadellidae, Coccinellidae, Cryllotalpidae, Cucujidae, Curculionidae, Dermestidae, Elateridae, Gelechiidae, Lygaeidae, Meloidae, Membracidae, Miridae, Noctuidae, Pentatomidae, Pyralidae, Scarabaeidae, Silvanidae, Spingidae, Tenebrionidae and/or Thripidae.

In some embodiments, the first seed treatment compositions described herein comprise an insecticide (or combination of insecticides) that is toxic to one or more species of *Acalymma, Acanthaoscelides* (e.g., *A. obtectus*), *Anasa* (e.g., *A. tristis*), *Anastrepha* (e.g., *A. ludens*), *Anoplophora* (e.g., *A. glabripennis*), *Anthonomus* (e.g., *A. eugenii*), *Acyrthosiphon* (e.g., *A. pisum*), *Bactrocera* (e.g., *B. dosalis*), *Bemisia* (e.g., *B. argentifolii, B. tabaci*), *Brevicoryne* (e.g., *B. brassicae*), *Bruchidius* (e.g., *B. atrolineatus*), *Bruchus* (e.g., *B. atomarius, B. dentipes, B. lentis, B. pisorum* and/or *B. rufipes*), *Callosobruchus* (e.g., *C. chinensis, C. maculatus, C. rhodesianus, C. subinnotatus, C. theobromae*), *Caryedon* (e.g., *C. serratus*), *Cassadinae, Ceratitis* (e.g., *C. capitata*), *Chrysomelinae, Circulifer* (e.g., *C. tenellus*), *Criocerinae, Cryptocephalinae, Cryptolestes* (e.g., *C. ferrugineus, C. pusillis, C. pussilloides*), *Cylas* (e.g., *C. formicarius*), *Delia* (e.g., *D. antiqua*), *Diabrotica, Diaphania* (e.g., *D. nitidalis*), *Diaphorina* (e.g., *D. citri*), *Donaciinae, Ephestia* (e.g., *E. cautella, E. elutella, E., keuhniella*), *Epilachna* (e.g., *E. varivestris*), *Epiphyas* (e.g., *E. postvittana*), *Eumolpinae, Galerucinae, Helicoverpa* (e.g., *H. zea*), *Heteroligus* (e.g., *H. meles*), *Iobesia* (e.g., *I. botrana*), *Lamprosomatinae, Lasioderma* (e.g., *L. serricorne*), *Leptinotarsa* (e.g., *L. decemlineata*), *Leptoglossus, Liriomyza* (e.g., *L. trifolii*), *Manducca, Melittia* (e.g., *M. cucurbitae*), *Myzus* (e.g., *M. persicae*), *Nezara* (e.g., *N. viridula*), *Orzaephilus* (e.g., *O. merator, O. surinamensis*), *Ostrinia* (e.g., *O. nubilalis*), *Phthorimaea* (e.g., *P. operculella*), *Pieris* (e.g., *P. rapae*), *Plodia* (e.g., *P. interpunctella*), *Plutella* (e.g., *P. xylostella*), *Popillia* (e.g., *P. japonica*), *Prostephanus* (e.g., *P. truncates*), *Psila, Rhizopertha* (e.g., *R. dominica*), *Rhopalosiphum* (e.g., *R. maidis*), *Sagrinae, Solenopsis* (e.g., *S. invicta*), *Spilopyrinae, Sitophilus* (e.g., *S. granaries, S. oryzae* and/or *S. zeamais*), *Sitotroga* (e.g., *S. cerealella*), *Spodoptera* (e.g., *S. frugiperda*), *Stegobium* (e.g., *S. paniceum*), *Synetinae, Tenebrio* (e.g., *T. malens* and/or *T. molitor*), *Thrips* (e.g., *T. tabaci*), *Trialeurodes* (e.g., *T. vaporariorum*), *Tribolium* (e.g., *T. castaneum* and/or *T. confusum*), *Trichoplusia* (e.g., *T. ni*), *Trogoderma* (e.g., *T. granarium*) and *Trogossitidae* (e.g., *T. mauritanicus*).

The first treatment compositions described herein may comprise any suitable nematicide(s) including, but not limited to, biological nematicides and chemical nematicides. Nematicides may be selected so as to provide effective control against a broad spectrum of nematodes, including, but not limited to, phytoparasitic nematodes from the classes Chromadorea and Enoplea.

In some embodiments, the first seed treatment compositions described herein comprise a nematicide (or combination of nematicides) that is toxic to one or more strains of *Anguina, Aphelenchoides, Belonolaimus, Bursaphelenchus, Ditylenchus, Globodera, Helicotylenchus, Heterodera, Hirschmanniella, Meloidogyne, Naccobus, Pratylenchus, Radopholus, Rotylenshulus, Trichodorus, Tylenchulus* and/or *Xiphinema.*

As discussed above, the first seed treatment compositions described herein may comprise one or more biological insecticides and/or nematicides (i.e., one or more microorganisms the presence and/or output of which is toxic to an acarid, insect and/or nematode).

In some embodiments, the first compositions described herein comprise one or more chemical insecticides and/or nematicides. For example, in some embodiments, the first treatment compositions described herein comprise one or more carbamates, diamides, macrocyclic lactones, neonicotinoids, organophosphates, phenylpyrazoles, pyrethrins, spinosyns, synthetic pyrethroids, tetronic acids and/or tetramic acids.

Non-limiting examples of chemical insecticides and nematicides that may be useful in the first treatment compositions described herein include acrinathrin, alpha-cypermethrin, betacyfluthrin, cyhalothrin, cypermethrin, deltamethrin, esfenvalerate, etofenprox, fenpropathrin, fenvalerate, flucythrinate, fosthiazate, lambda-cyhalothrin, gamma-cyhalothrin, permethrin, tau-fluvalinate, transfluthrin, zeta-cypermethrin, cyfluthrin, bifenthrin, tefluthrin, eflusilanat, fubfenprox, pyrethrin, resmethrin, imidacloprid, acetamiprid, thiamethoxam, nitenpyram, thiacloprid, dinotefuran, clothianidin, imidaclothiz, chlorfluazuron, diflubenzuron, lufenuron, teflubenzuron, triflumuron, novaluron, flufenoxuron, hexaflumuron, bistrifluoron, noviflumuron, buprofezin, cyromazine, methoxyfenozide, tebufenozide, halofenozide, chromafenozide, endosulfan, fipronil, ethiprole, pyrafluprole, pyriprole, flubendiamide, chlorantraniliprole (e.g., Rynaxypyr), cyantraniliprole, emamectin, emamectin benzoate, abamectin, ivermectin, milbemectin, lepimectin, tebufenpyrad, fenpyroximate, pyridaben, fenazaquin, pyrimidifen, tolfenpyrad, dicofol, cyenopyrafen, cyflumetofen, acequinocyl, fluacrypyrin, bifenazate, diafenthiuron, etoxazole, clofentezine, spinosad, triarathen, tetradifon, propargite, hexythiazox, bromopropylate, chinomethionat, amitraz, pyrifluquinazon, pymetrozine, flonicamid, pyriproxyfen, diofenolan, chlorfenapyr, metaflumizone, indoxacarb, chlorpyrifos, spirodiclofen, spiromesifen, spirotetramat, pyridalyl, spinctoram, acephate, triazophos, profenofos, oxamyl, spinetoram, fenamiphos, fenamipclothiahos, 4-{[(6-chloropyrid-3-yl)methyl](2,2-difluoroethyl) amino}furan-2(5H)-one, cadusaphos, carbaryl, carbofuran, ethoprophos, thiodicarb, aldicarb, aldoxycarb, metamidophos, methiocarb, sulfoxaflor, and tioxazafen and combinations thereof. In some embodiments, the first and/or second seed treatment compositions described herein comprise abamectin, aldicarb, aldoxycarb, bifenthrin, carbofuran, chlorantraniliprole, clothianidin, cyfluthrin, cyhalothrin, cypermethrin, cyantraniliprole, deltamethrin, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, spinetoram, spinosad, spirodiclofen, spirotetramat, tefluthrin, thiacloprid, thiamethoxam and/or thiodicarb. In some embodiments, the first and/or second seed treatment compositions described herein comprise an insecticide selected from the group consisting of clothianidin, thiamethoxam, imidacloprid, cyantraniliprole, chlorantraniliprole, fluopyram and tioxazafen.

In some embodiments, the compositions described herein comprise one or more commercial insecticides and nematicides used in accordance with the manufacturer's recommended amounts/concentrations.

The first treatment compositions described herein may comprise any suitable fungicide(s), including, but not limited to, biological fungicides and chemical fungicides. Fungicides may be selected so as to provide effective control against a broad spectrum of phytopathogenic fungi (and fungus-like organisms), including, but not limited to, soil-borne fungi from the classes Ascomycetes, Basidiomycetes, Chytridiomycetes, Deuteromycetes (syn. Fungi imperfecti), Peronosporomycetes (syn. Oomycetes), Plasmodiophoromycetes and Zygomycetes.

In some embodiments, the first seed treatment compositions described herein comprise a fungicide (or combination of fungicides) that is toxic to one or more strains of *Albugo* (e.g., *A. candida*), *Alternaria* (e.g., *A. alternata*), *Aspergillus* (e.g., *A. candidus, A. clavatus, A. flavus, A. fumigatus, A. parasiticus, A. restrictus, A. sojae, A. solani*), *Blumeria* (e.g., *B. graminis*), *Botrytis* (e.g., *B. cinerea*), *Cladosporum* (e.g., *C. cladosporioides*), *Colletotrichum* (e.g., *C. acutatum, C. boninense, C. capsici, C. caudatum, C. coccodes, C. crassipes, C. dematium, C. destructivum, C. fragariae, C. gloeosporioides, C. graminicola, C. kehawee, C. lindemuthianum, C. musae, C. orbiculare, C. spinaceae, C. sublineolum, C. trifolii, C. truncatum*), *Fusarium* (e.g., *F. graminearum, F. moniliforme, F. oxysporum, F. roseum, F. tricinctum*), *Helminthosporium, Magnaporthe* (e.g., *M. grisea, M. oryzae*), *Melamspora* (e.g., *M. lini*), *Mycosphaerella* (e.g., *M. graminicola*), *Nematospora, Penicillium* (e.g., *P. rugulosum, P. verrucosum*), *Phakopsora* (e.g., *P. pachyrhizi*), *Phomopsis, Phytiphtoria* (e.g., *P. infestans*), *Puccinia* (e.g., *P. graminis, P. striiformis, P. tritici, P. triticina*), *Pucivinia* (e.g., *P. graministice*), *Pythium, Pytophthora, Rhizoctonia* (e.g., *R. solani*), *Scopulariopsis, Selerotinia, Thielaviopsis* and/or *Ustilago* (e.g. *U. maydis*).

As discussed above, the first treatment compositions described herein may comprise one or more biological fungicides (i.e., one or more microorganisms the presence and/or output of which is toxic to a fungus).

In some embodiments, the first treatment compositions described herein comprise one or more chemical fungicides. For example, in some embodiments, the first treatment compositions described herein comprise one or more aromatic hydrocarbons, benzimidazoles, benzthiadiazole, carboxamides, carboxylic acid amides, morpholines, phenylamides, phosphonates, quinone outside inhibitors (e.g. strobilurins), thiazolidines, thiophanates, thiophene carboxamides and/or triazoles.

Non-limiting examples of chemical fungicides that may be useful in the first seed treatment compositions described herein include strobilurins, such as azoxystrobin, coumethoxystrobin, coumoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, 2-[2-(2,5-dimethyl-phenoxymethyl)-phenyl]-3-methoxyacrylic acid methyl ester and 2-(2-(3-(2,6-dichlorophenyl)-1-methyl-allylideneaminooxymethyl)-phenyl)-2-methoxyimino-N-methyl-acetamide; carboxamides, such as carboxanilides (e.g., benalaxyl, benalaxyl-M, benodanil, bixafen, boscalid, carboxin, fenfuram, fenhexamid, fluopyram, flutolanil, fluxapyroxad, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(4'-trifluoromethylthiobiphenyl-2-yl)-3-difluoromethyl-1-methyl-1H-pyra-zole-4-carboxamide, N-(2-(1,3,3-trimethylbutyl)-phenyl)-1,3-dimethyl-5-fluoro-1H-pyrazole-4-carboxamide), carboxylic morpholides (e.g., dimethomorph, flumorph, pyrimorph), benzoic acid amides (e.g., flumetover, fluopicolide, fluopyram, zoxamide), carpropamid, dicyclomet, mandiproamid, oxytetracyclin, silthiofam and N-(6-methoxy-pyridin-3-yl) cyclopropanecarboxylic acid amide; azoles, such as triazoles (e.g., azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole) and imidazoles (e.g., cyazofamid, imazalil, pefurazoate, prochloraz, triflumizol); heterocyclic compounds, such as pyridines (e.g., fluazinam, pyrifenox (cf. D1b), 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine), pyrimidines (e.g., bupirimate, cyprodinil, diflumetorim, fenarimol, ferimzone, mepanipyrim, nitrapyrin, nuarimol, pyrimethanil), piperazines (e.g., triforine), pyrroles (e.g., fenpiclonil, fludioxonil), morpholines (e.g., aldimorph, dodemorph, dodemorph-acetate, fenpropimorph, tridemorph), piperidines (e.g., fenpropidin); dicarboximides (e.g., fluoroimid, iprodione, procymidone, vinclozolin), non-aromatic 5-membered heterocycles (e.g., famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester), acibenzolar-S-methyl, ametoctradin, amisulbrom, anilazin, blasticidin-S, captafol, captan, chinomethionat, dazomet, debacarb, diclomezine, difenzoquat, difenzoquat-methylsulfate, fenoxanil, folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxy-pyrimidin-2-yl)-2-methyl-1H-benzoimidazole and 5-chloro-7-(4-methylpiperidin-1-yl)-6-(2,4,6-trifluorophenyl)-[1,2,4]triazolo-[1,5-a]pyrimidine; benzimidazoles, such as carbendazim; and other active substances, such as guanidines (e.g., guanidine, dodine, dodine free base, guazatine, guazatine-acetate, iminoctadine), iminoctadine-triacetate and iminoctadine-tris(albesilate); antibiotics (e.g., kasugamycin, kasugamycin hydrochloride-hydrate, streptomycin, polyoxine and validamycin A), nitrophenyl derivates (e.g., binapacryl, dicloran, dinobuton, dinocap, nitrothal-isopropyl, tecnazen); organometal compounds (e.g., fentin salts, such as fentin-acetate, fentin chloride, fentin hydroxide); sulfur-containing heterocyclyl compounds (e.g., dithianon, isoprothiolane), organophosphorus compounds (e.g., edifenphos, fosetyl, fosetyl-aluminum, iprobenfos, phosphorus acid and its salts, pyrazophos, tolclofos-methyl), organochlorine compounds (e.g., chlorothalonil, dichlofluanid, dichlorophen, flusulfamide, hexachlorobenzene, pencycuron, pentachlorphenole and its salts, phthalide, quintozene, thiophanate-methyl, thiophanate, tolylfluanid, N-(4-chloro-2-nitro-phenyl)-N-ethyl-4-methyl-benzenesulfonamide) and inorganic active substances (e.g., Bordeaux mixture, copper acetate, copper hydroxide, copper oxychloride, basic copper sulfate, sulfur) and combinations thereof. In some embodiments, the first and/or second seed treatment compositions described herein comprise acibenzolar-S-methyl, azoxystrobin, benalaxyl, bixafen, boscalid, carbendazim, cyproconazole, dimethomorph, epoxiconazole, fludioxonil, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thiabendazole, thifluzamide, thiophanate, tolclofos-methyl, trifloxystrobin and triticonazole. In some embodiments, the first and/or second seed treatment compositions described herein comprise azoxystrobin, pyraclostrobin, fluoxastrobin, trifloxystrobin, ipconazole, prothioconazole, sedaxane, fludioxonil, metalaxyl, mefenoxam, thiabendazole, fluxapyroxad and/or fluopyram.

In some embodiments, the first seed treatment compositions described herein comprise one or more commercial fungicides used in accordance with the manufacturer's recommended amounts/concentrations.

3. Anionic Polymer

In the processes described herein, the first seed treatment composition comprises an anionic polymer.

Non-limiting examples of suitable anionic polymers include poly(methyl vinyl ether-alt-maleic acid); poly(styrene-alt-maleic acid); poly(isobutylene-co-maleic acid); polyacrylic acid; poly(ethylene-co-acrylic acid); poly(tert-butyl acrylate-co-ethyl acrylate-co-methacrylic acid); poly(styrene-co-maleic acid), partial isobutyl ester; poly(styrene)-block-poly(acrylic acid); poly(acrylic acid), partial sodium salt-graft-poly(ethylene oxide); poly(methyl methacrylate-co-methacrylic acid); poly(acrylic acid-co-maleic acid); and poly(methacrylic acid). Generally, the anionic polymer may be present in its acid form, as a monovalent salt (e.g., a sodium or potassium salt), or any combination thereof.

In some embodiments, the first seed treatment composition comprises an anionic polysaccharide. Non-limiting examples of suitable anionic polysaccharides include alginates, carrageenan, carboxymethyl cellulose, and xanthan gum. In some embodiments, the anionic polysaccharide comprises one or more synthetic polymers having carboxylate or sulfonate groups.

In some embodiments, the first seed treatment composition comprises an alginate. For example, the composition may comprise alginic acid. In some embodiments, the alginate is incorporated into the composition in the form of a water-soluble salt. Non-limiting examples of suitable alginate salts include such as sodium alginate and potassium alginate.

In some embodiments, when the first seed treatment composition comprises an alginate, the alginate concentration can range from about 0.5% to about 5% by weight of the composition, for example, from about 1% to about 4% by weight.

Second Seed Treatment Composition

In the processes described herein, there is a second seed treatment composition. The second seed treatment composition comprises one or more polyvalent cations. As described above, the polyvalent cations react with the anionic polysaccharide to initiate a crosslinking process, which results in the formation of a polymeric film in situ on the surface of the seed.

The polyvalent cations may be of any alkaline earth metal, transition metal or other metal, and are preferably of a metal that is agronomically acceptable and recognized as inert for permitted use in agricultural compositions. Alternatively, in some embodiments, the polyvalent cations may be organic cations.

In some embodiments, the second seed treatment composition comprises one or more divalent cations. Non-limiting examples of suitable divalent cations include alkaline earth metals and transition metals. For example, in some instances, the divalent cations are selected from the group consisting of, barium, calcium, cobalt, copper, iron, magnesium, nickel, tin, titanium, vanadium, and zinc. In some instances, the second seed treatment composition may comprise divalent calcium ions or divalent magnesium ions.

Non-limiting examples of suitable organic cations include polyamines such as spermine, putrescine, and spermidine.

The polyvalent cations may be in some embodiments incorporated into the second seed treatment composition in the form of a salt. The polyvalent cations may be derived from various salts (e.g., the salt of a strong acid such as a metal chloride or metal sulfate or the salt of a di-, tri- or other polycarboxylic acid or derivative) or other compounds by dissociation or dissolution in the composition or from the elemental metal.

Suitable source compounds for the polyvalent cations include, without limitation, calcium chloride, magnesium chloride, calcium carbonate, calcium sulfate, magnesium sulfate, aluminum chloride, aluminum hydroxide, aluminum oxide, aluminum sulfate, antimony trioxide, barium carbonate, barium sulfate, cobalt carbonate, cobalt sulfate, copper acetate, copper carbonate, copper hydroxide, copper nitrate, copper sulfate, cupric oxide, cuprous oxide, ferric ammonium sulfate, ferric chloride, ferric oxide, ferric oxide hydrate, ferric sulfate, ferrous ammonium sulfate, ferrous oxide, ferrous sulfate, iron, iron salts of di-, tri- or other polycarboxylic acids such as iron citrate, iron hydroxide oxide, ferroferric oxide, nickel chloride, nickel acetate, nickel sulfate, tin oxide, titanium sulfate, vanadyl sulfate, zinc acetate, zinc chloride, zinc hydroxide, zinc iron oxide, zinc naphthenate, zinc oxide, zinc oxide sulfate ($Zn_4O_3(SO_4)$), zinc sulfate (basic), zinc sulfate (monohydrate) and mixtures thereof.

For example, in some instances, the second seed treatment composition comprises a salt selected from the group consisting of calcium chloride, magnesium chloride, calcium carbonate, calcium sulfate, and magnesium sulfate.

Additional Components

Generally, the first and/or second seed treatment compositions described herein can also comprise an additional component. The additional component can be an additional active ingredient or non-active ingredient, including for example any adjuvants, excipients, nutrients, micronutrients, or other desirable components useful in seed treatment formulations. The additional component may be applied before, during or after the first seed treatment composition. In other embodiments, the additional component is applied during or after the second seed treatment composition. In other embodiments, at least one additional component is applied before, during or after the first seed treatment composition and at least one additional component is applied before, during or after the second seed treatment composition.

The additional component may comprise one or more agrochemicals. For example, the first and/or second seed treatment compositions described herein may comprise any suitable pesticide(s), including, but not limited to, fungicides, herbicides, insecticides, and nematicides. In some embodiments, the first and/or second seed treatment compositions described herein comprise one or more biopesticides (e.g., one or more biofungicides, bioinsecticides and/or bionematicides).

The first and/or second seed treatment compositions described herein may comprise any suitable insecticide(s), including, but not limited to, biological insecticides and chemical insecticides. Insecticides may be selected so as to provide effective control against a broad spectrum of insects, including, but not limited to, insects from the orders Coleoptera, Dermaptera, Diptera, Hemiptera, Homoptera, Hymenoptera, Lepidoptera, Orthoptera and Thysanoptera. For example, the first and/or second seed treatment compositions described herein may comprise one or more insecticides toxic to insects from the families Acrididae, Aleytodidae, Anobiidae, Anthomyiidae, Aphididae, Bostrichidae, Bruchidae, Cecidomyiidae, Cerambycidae, Cercopidae, Chrysomelidae, Cicadellidae, Coccinellidae, Cryllotalpidae, Cucujidae, Curculionidae, Dermestidae, Elateridae, Gelechiidae, Lygaeidae, Meloidae, Membracidae, Miridae, Noctuidae, Pentatomidae, Pyralidae, Scarabaeidae, Silvanidae, Spingidae, Tenebrionidae and/or Thripidae.

In some embodiments, the first and/or second seed treatment compositions described herein comprise an insecticide (or combination of insecticides) that is toxic to one or more species of *Acalymma*, *Acanthaoscelides* (e.g., *A. obtectus*), *Anasa* (e.g., *A. tristis*), *Anastrepha* (e.g., *A. ludens*), *Anoplophora* (e.g., *A. glabripennis*), *Anthonomus* (e.g., *A. eugenii*), *Acyrthosiphon* (e.g., *A. pisum*), *Bactrocera* (e.g., *B. dosalis*), *Bemisia* (e.g., *B. argentifolii*, *B. tabaci*), *Brevicoryne* (e.g., *B. brassicae*), *Bruchidius* (e.g., *B. atrolineatus*), *Bruchus* (e.g., *B. atomarius*, *B. dentipes*, *B. lentis*, *B. pisorum* and/or *B. rufipes*), *Callosobruchus* (e.g., *C. chinensis*, *C. maculatus*, *C. rhodesianus*, *C. subinnotatus*, *C. theobromae*), *Caryedon* (e.g., *C. serratus*), *Cassadinae*, *Ceratitis* (e.g., *C. capitata*), *Chrysomelinae*, *Circulifer* (e.g., *C. tenellus*), *Criocerinae*, *Cryptocephalinae*, *Cryptolestes* (e.g., *C. ferrugineus*, *C. pusillis*, *C. pussilloides*), *Cylas* (e.g., *C. formicarius*), *Delia* (e.g., *D. antiqua*), *Diabrotica*, *Diaphania* (e.g., *D. nitidalis*), *Diaphorina* (e.g., *D. citri*), *Donaciinae*, *Ephestia* (e.g, *E. cautella*, *E. elutella*, *E.*, *keuhniella*), *Epilachna* (e.g., *E. varivestris*), *Epiphyas* (e.g., *E. postvittana*), *Eumolpinae*, *Galerucinae*, *Helicoverpa* (e.g., *H. zea*), *Heteroligus* (e.g., *H. meles*), *Iobesia* (e.g., *I. botrana*), *Lamprosomatinae*, *Lasioderma* (e.g., *L. serricorne*), *Leptinotarsa* (e.g., *L. decemlineata*), *Leptoglossus*, *Liriomyza* (e.g., *L. trifolii*), *Manducca*, *Melittia* (e.g., *M. cucurbitae*), *Myzus* (e.g., *M. persicae*), *Nezara* (e.g., *N. viridula*), *Orzaephilus* (e.g., *O. merator*, *O. surinamensis*), *Ostrinia* (e.g., *O. nubilalis*), *Phthorimaea* (e.g., *P. operculella*), *Pieris* (e.g., *P. rapae*), *Plodia* (e.g., *P. interpunctella*), *Plutella* (e.g., *P. xylostella*), *Popillia* (e.g., *P. japonica*), *Prostephanus* (e.g., *P. truncates*), *Psila*, *Rhizopertha* (e.g., *R. dominica*), *Rhopalosiphum* (e.g., *R. maidis*), *Sagrinae*, *Solenopsis* (e.g., *S. invicta*), *Spilopyrinae*, *Sitophilus* (e.g., *S. granaries*, *S. oryzae* and/or *S. zeamais*), *Sitotroga* (e.g., *S. cerealella*), *Spodoptera* (e.g., *S. frugiperda*), *Stegobium* (e.g., *S. paniceum*), *Synetinae*, *Tenebrio* (e.g., *T. malens* and/or *T. molitor*), *Thrips* (e.g., *T. tabaci*), *Trialeurodes* (e.g., *T. vaporariorum*), *Tribolium* (e.g., *T. castaneum* and/or *T. confusum*), *Trichoplusia* (e.g., *T. ni*), *Trogoderma* (e.g., *T. granarium*) and *Trogossitidae* (e.g., *T. mauritanicus*).

Additional species of insects that may be targeted by compositions of the present disclosure may be found in CAPINERA, HANDBOOK OF VEGETABLE PESTS (2001) and Steffey and Gray, Managing Insect Pests, in ILLINOIS AGRONOMY HANDBOOK (2008).

The first and/or second seed treatment compositions described herein may comprise any suitable nematicide(s) including, but not limited to, biological nematicides and chemical nematicides. Nematicides may be selected so as to provide effective control against a broad spectrum of nematodes, including, but not limited to, phytoparasitic nematodes from the classes Chromadorea and Enoplea.

In some embodiments, the first and/or second seed treatment compositions described herein comprise a nematicide (or combination of nematicides) that is toxic to one or more strains of *Anguina*, *Aphelenchoides*, *Belonolaimus*, *Bursaphelenchus*, *Ditylenchus*, *Globodera*, *Helicotylenchus*, *Heterodera*, *Hirschmanniella*, *Meloidogyne*, *Naccobus*, *Pratylenchus*, *Radopholus*, *Rotylenshulus*, *Trichodorus*, *Tylenchulus* and/or *Xiphinema*.

Additional examples of nematodes that may be targeted by the first and/or second seed treatment compositions described herein may be found in CAPINERA, HANDBOOK OF VEGETABLE PESTS (2001) and Niblack, Nematodes, in ILLINOIS AGRONOMY HANDBOOK (2008).

As discussed above, the first and/or second seed treatment compositions described herein may comprise one or more biological insecticides and/or nematicides (i.e., one or more microorganisms the presence and/or output of which is toxic to an acarid, insect and/or nematode).

In some embodiments, the first and/or second seed treatment compositions described herein comprise one or more chemical insecticides and/or nematicides. For example, in some embodiments, the first and/or second seed treatment compositions described herein comprise one or more carbamates, diamides, macrocyclic lactones, neonicotinoids, organophosphates, phenylpyrazoles, pyrethrins, spinosyns, synthetic pyrethroids, tetronic acids and/or tetramic acids.

Non-limiting examples of chemical insecticides and nematicides that may be useful in the first and/or second seed treatment compositions described herein include acrinathrin, alpha-cypermethrin, betacyfluthrin, cyhalothrin, cypermethrin, deltamethrin, esfenvalerate, etofenprox, fenpropathrin, fenvalerate, flucythrinate, fosthiazate, lambda-cyhalothrin, gamma-cyhalothrin, permethrin, tau-fluvalinate, transfluthrin, zeta-cypermethrin, cyfluthrin, bifenthrin, tefluthrin, eflusilanat, fubfenprox, pyrethrin, resmethrin, imidacloprid, acetamiprid, thiamethoxam, nitenpyram, thiacloprid, dinotefuran, clothianidin, imidaclothiz, chlorfluazuron, diflubenzuron, lufenuron, teflubenzuron, triflumuron, novaluron, flufenoxuron, hexaflumuron, bistrifluoron, noviflumuron, buprofezin, cyromazine, methoxyfenozide, tebufenozide, halofenozide, chromafenozide, endosulfan, fipronil, ethiprole, pyrafluprole, pyriprole, flubendiamide, chlorantraniliprole (e.g., Rynaxypyr), cyantraniliprole, emamectin, emamectin benzoate, abamectin, ivermectin, milbemectin, lepimectin, tebufenpyrad, fenpyroximate, pyridaben, fenazaquin, pyrimidifen, tolfenpyrad, dicofol, cyenopyrafen, cyflumetofen, acequinocyl, fluacrypyrin, bifenazate, diafenthiuron, etoxazole, clofentezine, spinosad, triarathen, tetradifon, propargite, hexythiazox, bromopropylate, chinomethionat, amitraz, pyrifluquinazon, pymetrozine, flonicamid, pyriproxyfen, diofenolan, chlorfenapyr, metaflumizone, indoxacarb, chlorpyrifos, spirodiclofen, spiromesifen, spirotetramat, pyridalyl, spinctoram, acephate, triazophos, profenofos, oxamyl, spinetoram, fenamiphos, fenamipclothiahos, 4-{[(6-chloropyrid-3-yl)methyl](2,2-difluoroethyl)amino}furan-2 (5H)-one, cadusaphos, carbaryl, carbofuran, ethoprophos, thiodicarb, aldicarb, aldoxycarb, metamidophos, methiocarb, sulfoxaflor, and tioxazafen and combinations thereof. In some embodiments, the first and/or second seed treatment compositions described herein comprise abamectin, aldicarb, aldoxycarb, bifenthrin, carbofuran, chlorantraniliprole, clothianidin, cyfluthrin, cyhalothrin, cypermethrin, cyantraniliprole, deltamethrin, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, spinetoram, spinosad, spirodiclofen, spirotetramat, tefluthrin, thiacloprid, thiamethoxam and/or thiodicarb. In some embodiments, the first and/or second seed treatment compositions described herein comprise an insecticide selected from the group consisting of clothianidin, thiamethoxam, imidacloprid, cyantraniliprole, chlorantraniliprole, fluopyram and tioxazafen.

Additional examples of insecticides and nematicides that may be included in the first and/or second seed treatment compositions described herein may be found in Steffey and Gray, *Managing Insect Pests*, in ILLINOIS AGRONOMY HANDBOOK (2008) and Niblack, *Nematodes*, in ILLINOIS AGRONOMY HANDBOOK (2008).

In some embodiments, the first and/or second seed treatment compositions described herein comprise one or more commercial insecticides and nematicides used in accordance with the manufacturer's recommended amounts/concentrations.

The first and/or second seed treatment compositions described herein may comprise any suitable fungicide(s), including, but not limited to, biological fungicides and chemical fungicides. Fungicides may be selected so as to provide effective control against a broad spectrum of phytopathogenic fungi (and fungus-like organisms), including, but not limited to, soil-borne fungi from the classes Ascomycetes, Basidiomycetes, Chytridiomycetes, Deuteromycetes (syn. Fungi imperfecti), Peronosporomycetes (syn. Oomycetes), Plasmodiophoromycetes and Zygomycetes.

In some embodiments, the first and/or second seed treatment compositions described herein comprise a fungicide (or combination of fungicides) that is toxic to one or more strains of *Albugo* (e.g., *A. candida*), *Alternaria* (e.g., *A. alternata*), *Aspergillus* (e.g., *A. candidus, A. clavatus, A. flavus, A. fumigatus, A. parasiticus, A. restrictus, A. sojae, A. solani*), *Blumeria* (e.g., *B. graminis*), *Botrytis* (e.g., *B. cinerea*), *Cladosporum* (e.g., *C. cladosporioides*), *Colletotrichum* (e.g., *C. acutatum, C. boninense, C. capsici, C. caudatum, C. coccodes, C. crassipes, C. dematium, C. destructivum, C. fragariae, C. gloeosporioides, C. graminicola, C. kehawee, C. lindemuthianum, C. musae, C. orbiculare, C. spinaceae, C. sublineolum, C. trifolii, C. truncatum*), *Fusarium* (e.g., *F. graminearum, F. moniliforme, F. oxysporum, F. roseum, F. tricinctum*), *Helminthosporium, Magnaporthe* (e.g., *M. grisea, M. oryzae*), *Melamspora* (e.g., *M. lini*), *Mycosphaerella* (e.g., *M. graminicola*), *Nematospora, Penicillium* (e.g., *P. rugulosum, P. verrucosum*), *Phakopsora* (e.g., *P. pachyrhizi*), *Phomopsis, Phytiphtoria* (e.g., *P. infestans*), *Puccinia* (e.g., *P. graminis, P. striiformis, P. tritici, P. triticina*), *Pucivinia* (e.g., *P. graministice*), *Pythium, Pytophthora, Rhizoctonia* (e.g., *R. solani*), *Scopulariopsis, Selerotinia, Thielaviopsis* and/or *Ustilago* (e.g. *U. maydis*).

Additional examples of fungi that may be targeted by the first and/or second seed treatment compositions described herein may be found in Bradley, *Managing Diseases*, in ILLINOIS AGRONOMY HANDBOOK (2008).

As discussed above, the first and/or second seed treatment compositions described herein may comprise one or more biological fungicides (i.e., one or more microorganisms the presence and/or output of which is toxic to a fungus).

In some embodiments, the first and/or second seed treatment compositions described herein comprise one or more chemical fungicides. For example, in some embodiments, the first and/or second seed treatment compositions described herein comprise one or more aromatic hydrocarbons, benzimidazoles, benzthiadiazole, carboxamides, carboxylic acid amides, morpholines, phenylamides, phosphonates, quinone outside inhibitors (e.g. strobilurins), thiazolidines, thiophanates, thiophene carboxamides and/or triazoles.

Non-limiting examples of chemical fungicides that may be useful in the first and/or second seed treatment compositions described herein include strobilurins, such as azoxystrobin, coumethoxystrobin, coumoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, 2-[2-(2,5-dimethyl-phenoxymethyl)-phenyl]-3-methoxy-acrylic acid methyl ester and 2-(2-(3-(2,6-dichlorophenyl)-1-methyl-allylideneaminooxymethyl)-phenyl)-2-methoxyimino-N-methyl-acetamide; carboxamides, such as carboxanilides (e.g., benalaxyl, benalaxyl-M, benodanil, bixafen, boscalid, carboxin, fenfuram, fenhexamid, fluopyram, flutolanil, fluxapyroxad, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(4'-trifluoromethylthiobiphenyl-2-yl)-3-difluoromethyl-1-methyl-1H-pyra-zole-4-carboxamide, N-(2-(1,3,3-trimethylbutyl)-phenyl)-1,3-dimethyl-5-fluoro-1H-pyrazole-4-carboxamide), carboxylic morpholides (e.g., dimethomorph, flumorph, pyrimorph), benzoic acid amides (e.g., flumetover, fluopicolide, fluopyram, zoxamide), carpropamid, dicyclomet, mandiproamid, oxytetracyclin, silthiofam and N-(6-methoxy-pyridin-3-yl) cyclopropanecarboxylic acid amide; azoles, such as triazoles (e.g., azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole) and imidazoles (e.g., cyazofamid, imazalil, pefurazoate, prochloraz, triflumizol); heterocyclic compounds, such as pyridines (e.g., fluazinam, pyrifenox (cf. D1b), 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine), pyrimidines (e.g., bupirimate, cyprodinil, diflumetorim, fenarimol, ferimzone, mepanipyrim, nitrapyrin, nuarimol, pyrimethanil), piperazines (e.g., triforine), pyrroles (e.g., fenpiclonil, fludioxonil), morpholines (e.g., aldimorph, dodemorph, dodemorph-acetate, fenpropimorph, tridemorph), piperidines (e.g., fenpropidin); dicarboximides (e.g., fluoroimid, iprodione, procymidone, vinclozolin), non-aromatic 5-membered heterocycles (e.g., famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester), acibenzolar-S-methyl, ametoctradin, amisulbrom, anilazin, blasticidin-S, captafol, captan, chinomethionat, dazomet, debacarb, diclomezine, difenzoquat, difenzoquat-methylsulfate, fenoxanil, folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxy-pyrimidin-2-yl)-2-methyl-1H-benzoimidazole and 5-chloro-7-(4-methylpiperidin-1-yl)-6-(2,4,6-trifluorophenyl)-[1,2,4]triazolo-[1,5-a]pyrimidine; benzimidazoles, such as carbendazim; and other active substances, such as guanidines (e.g., guanidine, dodine, dodine free base, guazatine, guazatine-acetate, iminoctadine), iminoctadine-triacetate and iminoctadine-tris(albesilate); antibiotics (e.g., kasugamycin, kasugamycin hydrochloride-hydrate, streptomycin, polyoxine and validamycin A), nitrophenyl derivates (e.g., binapacryl, dicloran, dinobuton, dinocap, nitrothal-isopropyl, tecnazen); organometal compounds (e.g., fentin salts, such as fentin-acetate, fentin chloride, fentin hydroxide); sulfur-containing heterocyclyl compounds (e.g., dithianon, isoprothiolane), organophosphorus compounds (e.g., edifenphos, fosetyl, fosetyl-aluminum, iprobenfos, phosphorus acid and its salts, pyrazophos, tolclofos-methyl), organochlorine compounds (e.g., chlorothalonil, dichlofluanid, dichlorophen, flusulfamide, hexachlorobenzene, pencycuron, pentachlorphenole and its salts, phthalide, quintozene, thiophanate-methyl, thiophanate, tolylfluanid, N-(4-chloro-2-nitro-phenyl)-N-ethyl-4-methyl-benzenesulfonamide) and inorganic active substances (e.g., Bordeaux mixture, copper acetate, copper hydroxide, copper oxychloride, basic copper sulfate, sulfur) and combinations thereof. In some embodiments, the first and/or second seed treatment compositions described herein comprise acibenzolar-S-methyl, azoxystrobin, benalaxyl, bixafen, boscalid, carbendazim, cyproconazole, dimethomorph, epoxiconazole, fludioxonil, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thiabendazole, thifluzamide, thiophanate, tolclofos-methyl, trifloxystrobin and triticonazole. In some embodiments, the first and/or second seed treatment compositions described herein comprise azoxystrobin, pyraclostrobin, fluoxastrobin, trifloxystrobin, ipconazole, prothioconazole, sedaxane, fludioxonil, metalaxyl, mefenoxam, thiabendazole, fluxapyroxad and/or fluopyram.

Additional examples of fungicides that may be included in the first and/or second seed treatment compositions described herein may be found in Bradley, *Managing Diseases*, in ILLINOIS AGRONOMY HANDBOOK (2008).

In some embodiments, the first and/or second seed treatment compositions described herein comprise one or more commercial fungicides used in accordance with the manufacturer's recommended amounts/concentrations.

The first and/or second seed treatment compositions described herein may comprise any suitable herbicide(s), including, but not limited to, biological herbicides and chemical herbicides. Herbicides may be selected so as to provide effective control against a broad spectrum of plants, including, but not limited to, plants from the families Asteraceae, Caryophyllaceae, Poaceae and Polygonaceae.

In some embodiments, The first and/or second seed treatment compositions described herein comprise an herbicide (or combination of herbicides) that is toxic to one or more strains of *Echinochloa* (e.g., *E. brevipedicellata, E. callopus, E. chacoensis, E. colona, E. crus-galli, E. crus-pavonis, E. elliptica, E. esculenta, E. frumentacea, E. glabrescens, E. haploclada, E. helodes, E. holciformis, E. inundata, E. jaliscana, E. jubata, E. kimberleyensis, E. lacunaria, E. macrandra, E. muricata, E. obtusiflora, E. oplismenoides, E. orzyoides, E. paludigena, E. picta, E. pithopus, E. polystachya, E. praestans, E. pyramidalis, E. rotundiflora, E. stagnina, E. telmatophila, E. turneriana, E. ugandensis, E. walteri*), *Fallopia* (e.g., *F. baldschuanica, F. japonica, F. sachalinensis*), *Stellaria* (e.g., *S. media*) and/or *Taraxacum* (e.g., *T. albidum, T. aphrogenes, T. brevicorniculatum, T. californicum, T. centrasiatum, T. ceratophorum, T. erythrospermum, T. farinosum, T. holmboei, T. japonicum, T. kok-saghyz, T. laevigatum T. officinale, T. platycarpum*).

Additional species of plants that may be targeted by the first and/or second seed treatment compositions described herein may be found in Hager, *Weed Management*, in ILLINOIS AGRONOMY HANDBOOK (2008) and LOUX ET AL., WEED CONTROL GUIDE FOR OHIO, INDIANA AND ILLINOIS (2015).

As discussed above, the first and/or second seed treatment compositions described herein may comprise one or more biological herbicides (i.e., one or more microorganisms the presence and/or output of which is toxic to a plant).

In some embodiments, the first and/or second seed treatment compositions described herein comprise one or more chemical herbicides. For example, in some embodiments, the first and/or second seed treatment compositions described herein comprise one or more acetyl CoA carboxylase (ACCase) inhibitors, acetolactate synthase (ALS) inhibitors, acetohydroxy acid synthase (AHAS) inhibitors, photosystem II inhibitors, photosystem I inhibitors, protoporphyrinogen oxidase (PPO or Protox) inhibitors, carotenoid biosynthesis inhibitors, enolpyruvyl shikimate-3-phosphate (EPSP) synthase inhibitor, glutamine synthetase inhibitor, dihydropteroate synthetase inhibitor, mitosis inhibitors, 4-hydroxyphenyl-pyruvate-dioxygenase (4-HPPD) inhibitors, synthetic auxins, auxin herbicide salts, auxin transport inhibitors, nucleic acid inhibitors and/or one or more salts, esters, racemic mixtures and/or resolved isomers thereof. Non-limiting examples of chemical herbicides that may be useful in the first and/or second seed treatment compositions described herein include 2,4-dichlorophenoxyacetic acid (2,4-D), 2,4,5-trichlorophenoxyacetic acid (2,4,5-T), ametryn, amicarbazone, aminocyclopyrachlor, acetochlor, acifluorfen, alachlor, atrazine, azafenidin, bentazon, benzofenap, bifenox, bromacil, bromoxynil, butachlor, butafenacil, butroxydim, carfentrazone-ethyl, chlorimuron, chlorotoluro, clethodim, clodinafop, clomazone, cyanazine, cycloxydim, cyhalofop, desmedipham, desmetryn, dicamba, diclofop, dimefuron, diuron, dithiopyr, fenoxaprop, fluazifop, fluazifop-P, fluometuron, flufenpyrethyl, flumiclorac-pentyl, flumioxazin, fluoroglycofen, fluthiacet-methyl, fomesafe, fomesafen, glyphosate, glufosinate, haloxyfop, hexazinone, imazamox, imazaquin, imazethapyr, ioxynil, isoproturon, isoxaflutole, lactofen, linuron, mecoprop, mecoprop-P, mesotrione, metamitron, metazochlor, methibenzuron, metolachlor (and S-metolachlor), metoxuron, metribuzin, monolinuron, oxadiargyl, oxadiazon, oxyfluorfen, phenmedipham, pretilachlor, profoxydim, prometon, prometry, propachlor, propanil, propaquizafop, propisochlor, pyraflufen-ethyl, pyrazon, pyrazolynate, pyrazoxyfen, pyridate, quizalofop, quizalofop-P (e.g., quizalofop-ethyl, quizalofop-P-ethyl, clodinafop-propargyl, cyhalofop-butyl, diclofop-methyl, fenoxaprop-P-ethyl, fluazifop-P-butyl, haloxyfop-methyl, haloxyfop-R-methyl), saflufenacil, sethoxydim, siduron, simazine, simetryn, sulcotrione, sulfentrazone, tebuthiuron, tembotrione, tepraloxydim, terbacil, terbumeton, terbuthylazine, thaxtomin (e.g., the thaxtomins described in U.S. Pat. No. 7,989,393), thenylchlor, tralkoxydim, triclopyr, trietazine, tropramezone, salts and esters thereof; racemic mixtures and resolved isomers thereof and combinations thereof. In some embodiments, the first and/or second seed treatment compositions described herein comprise acetochlor, clethodim, dicamba, flumioxazin, fomesafen, glyphosate, glufosinate, mesotrione, quizalofop, saflufenacil, sulcotrione, ethyl 2-((3-(2-chloro-4-fluoro-5-(3-methyl-2,6-dioxo-4-(trifluoromethyl)-2,3-dihydropyrimidin-1 (6H)-yl) phenoxy)pyridin-2-yl)oxy)acetate and/or 2,4-D. In some embodiments, the first and/or second seed treatment compositions described herein comprise glyphosate, glufosinate, dicamba, 2,4-D, acetochlor, metolachlor, pyroxasulfone, flumioxazin, fomesafen, lactofen, metribuzin, mesotrione, and/or ethyl 2-((3-(2-chloro-4-fluoro-5-(3-methyl-2,6-dioxo-4-(trifluoromethyl)-2,3-dihydropyrimidin-1 (6H)-yl) phenoxy)pyridin-2-yl)oxy)acetate.

Additional examples of herbicides that may be included in the first and/or second seed treatment compositions described herein may be found in Hager, *Weed Management*, in ILLINOIS AGRONOMY HANDBOOK (2008) and LOUX ET AL., WEED CONTROL GUIDE FOR OHIO, INDIANA AND ILLINOIS (2015).

In some embodiments, the first and second seed treatment compositions described herein comprise one or more commercial herbicides used in accordance with the manufacturer's recommended amounts/concentrations.

The first and/or second seed treatment compositions described herein may comprise any suitable plant signal molecule(s), including, but not limited to, lipochitooligosaccharides (LCOs), chitooligosaccharides (COs), chitinous compounds, flavonoids, jasmonic acid or derivatives thereof, linoleic acid or derivatives thereof, linolenic acid or derivatives thereof and karrikins.

The first and/or second seed treatment compositions described herein may comprise any suitable LCO(s).

LCOs, sometimes referred to as symbiotic nodulation (Nod) signals or Nod factors, consist of an oligosaccharide backbone of β-1,4-linked N-acetyl-D-glucosamine ("GlcNAc") residues with an N-linked fatty acyl chain condensed at the non-reducing end. LCOs differ in the number of GlcNAc residues in the backbone, in the length and degree of saturation of the fatty acyl chain and in the substitutions of reducing and non-reducing sugar residues. See, e.g., Denarie, et al., ANN. REV. BIOCHEM. 65:503 (1996); Hamel, et al., PLANTA 232:787 (2010); Prome, et al., PURE & APPL. CHEM. 70 (1): 55 (1998).

In some embodiments, the first and/or second seed treatment compositions described herein comprise one or more LCOs represented by formula I:

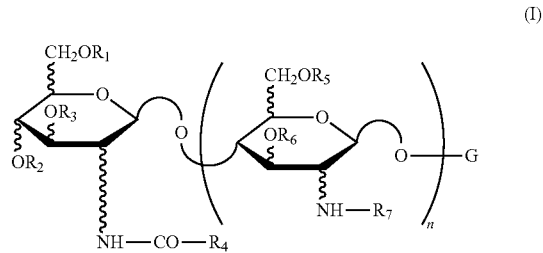

(I)

in which G is a hexosamine which can be substituted, for example, by an acetyl group on the nitrogen, a sulfate group, an acetyl group and/or an ether group on an oxygen; $R_1$, $R_2$, $R_3$, $R_5$, $R_6$ and $R_7$, which may be identical or different, represent H, $CH_3CO-$, $C_xH_y$ CO— where x is an integer between 0 and 17 and y is an integer between 1 and 35, or any other acyl group such as, for example, a carbamoyl; $R_4$ represents a saturated or mono-, di- or tri-unsaturated aliphatic chain containing at least 12 carbon atoms; and n is an integer between 1 and 4.

In some embodiments, the first and/or second seed treatment compositions described herein comprise one or more LCOs represented by formula II:

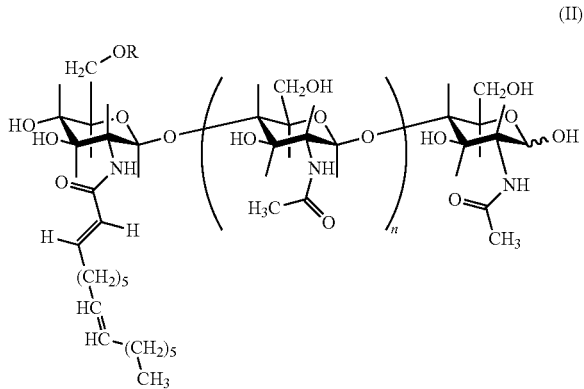

(II)

in which R represents H or $CH_3CO-$ and n is equal to 2 or 3. See, e.g., U.S. Pat. No. 5,549,718. A number of *Bradyrhizobium japonicum*-derived LCOs have also been described, including BjNod-V ($C_{18:1}$), BjNod-V ($A_C$, $C_{18:1}$), BjNod-V ($C_{16:1}$) and BjNod-V ($A_C$, $C_{16:0}$) (with "V" indicating the presence of five N-acetylglucosamines, "Ac" an acetylation, the number following the "C" indicating the number of carbons in the fatty acid side chain and the number following the ":" indicating the number of double bonds). See, e.g., U.S. Pat. Nos. 5,175,149 and 5,321,011. Additional LCOs obtained from bacterial strains include NodRM, NodRM-1, NodRM-3. When acetylated (the R=$CH_3CO-$), they become AcNodRM-1 and AcNodRM-3, respectively (U.S. Pat. No. 5,545,718).

In some embodiments, the first and/or second seed treatment compositions described herein comprise one or more LCOs represented by formula III:

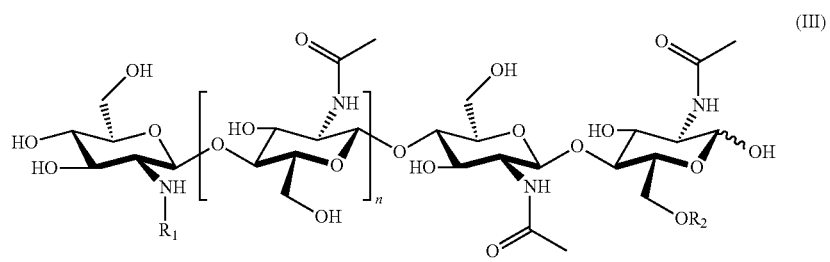

in which n=1 or 2; $R_1$ represents C16, C16:0, C16:1, C16:2, C18:0, C18:1Δ9Z or C18:1Δ11Z; and $R_2$ represents hydrogen or $SO_3H$.

LCOs included in compositions and methods of the present disclosure may be obtained from any suitable source.

In some embodiments, the LCO is obtained (i.e., isolated and/or purified) from a bacterial strain. For example, in some embodiments, the first and/or second seed treatment compositions described herein comprise one or more LCOs obtained from a of *Azorhizobium, Bradyrhizobium* (e.g., *B. japonicum*), *Mesorhizobium, Rhizobium* (e.g., *R. leguminosarum*), or *Sinorhizobium* (e.g., *S. meliloti*).

In some embodiments, the LCO is obtained (i.e., isolated and/or purified) from a mycorrhizal fungus. For example, in some embodiments, the first and/or second seed treatment compositions described herein comprise one or more LCOs obtained from a strain of Glomerocycota (e.g., *Glomus intraradicus*). See, e.g., WO 2010/049751 (in which the LCOs are referred to as "Myc factors").

In some embodiments, the LCO is synthetic. For example, in some embodiments, the first and/or second seed treatment compositions described herein comprise one or more of the synthetic LCOs described in WO 2005/063784, WO 2007/117500 and/or WO 2008/071674. In some embodiments, the synthetic LCO contains one or more modifications or substitutions, such as those described in Spaink, CRIT. REV. PLANT SCI. 54:257 (2000) and D'Haeze, supra. LCOs and precursors for the construction of LCOs (e.g., COs, which are themselves useful as plant signal molecules) may be synthesized by genetically engineered organisms. See, e.g., Samain et al., CARBOHYDRATE RES. 302:35 (1997); Cottaz, et al., METH. ENG. 7 (4): 311 (2005); and Samain, et al., J. BIOTECHNOL. 72:33 (1999) (e.g., FIG. 1 therein, which shows structures of COs that can be made recombinantly in *E. coli* harboring different combinations of genes nodBCHL).

Further examples of LCOs (and derivatives thereof) that may be useful in compositions and methods of the present disclosure are provided below as formula IV:

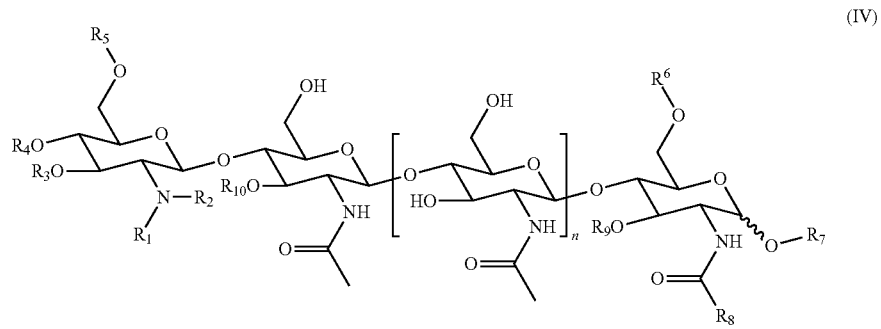

in which $R_1$ represents C14:0, 3OH—C14:0, iso-C15:0, C16:0, 3-OH—C16:0, iso-C15:0, C16:1, C16:2, C16:3, iso-C17:0, iso-C17:1, C18:0, 3OH—C18:0, C18:0/3-OH, C18:1, OH—C18:1, C18:2, C18:3, C18:4, C19:1 carbamoyl, C20:0, C20:1, 3-OH—C20:1, C20:1/3-OH, C20:2, C20:3, C22:1 and C18-26 (ω-1)-OH (which according to D'Haeze, et al., Glycobiology 12:79R-105R (2002), includes C18, C20, C22, C24 and C26 hydroxylated species and C16:1Δ9, C16:2 (Δ2,9) and C16:3 (Δ2,4,9)); $R_2$ represents hydrogen or methyl; $R_3$ represents hydrogen, acetyl or carbamoyl; $R_4$ represents hydrogen, acetyl or carbamoyl; $R_5$ represents hydrogen, acetyl or carbamoyl; $R_6$ represents hydrogen, arabinosyl, fucosyl, acetyl, $SO_3H$, sulfate ester, 3-O—S-2-O-MeFuc, 2-O-MeFuc and 4-O-AcFuc; $R_7$ represents hydrogen, mannosyl or glycerol; $R_8$ represents hydrogen, methyl, or —$CH_2OH$; $R_9$ represents hydrogen, arabinosyl, or fucosyl; $R_{10}$ represents hydrogen, acetyl or fucosyl; and n represents 0, 1, 2 or 3. Naturally occurring LCOs embraced by this structure are described in D'Haeze, et al., supra.

Further examples of LCOs (and derivatives thereof) that may be useful in compositions and methods of the present disclosure are provided below as structures V-XXXIII:

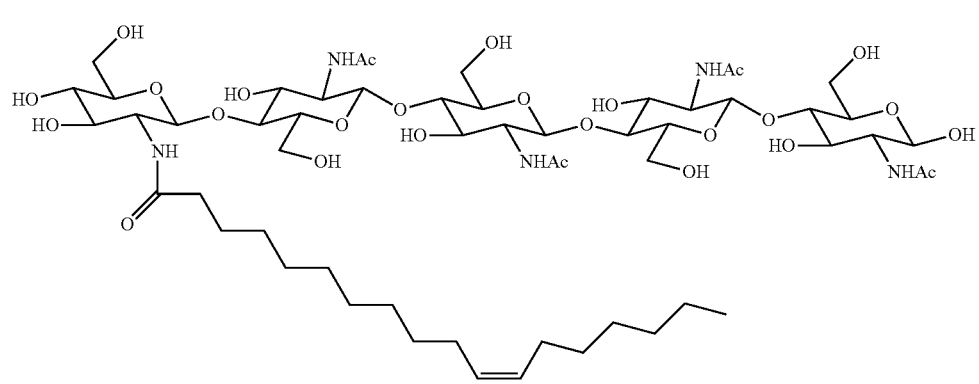

(V)

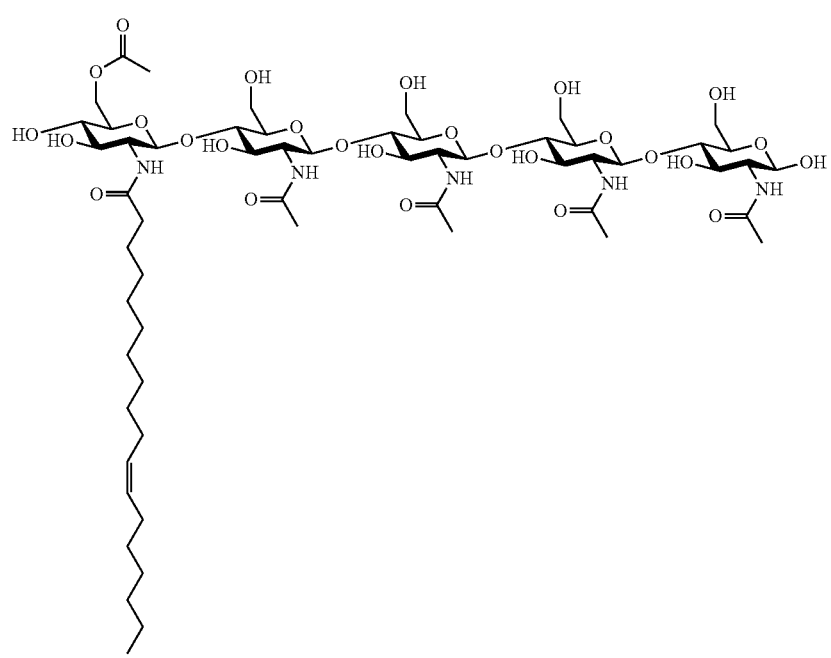

(VI)

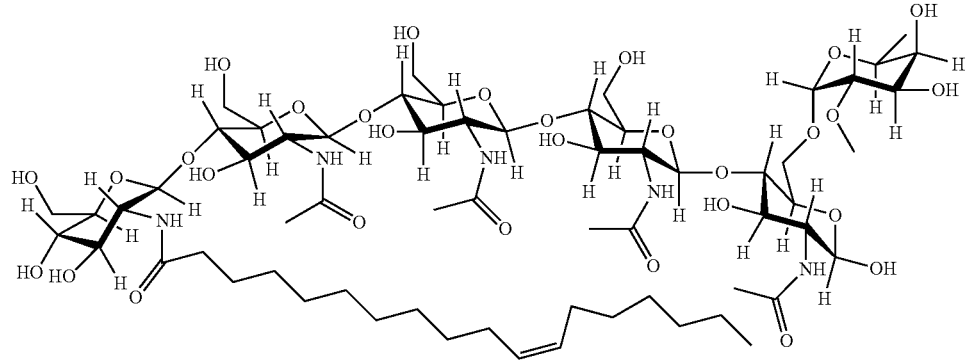
(VII)
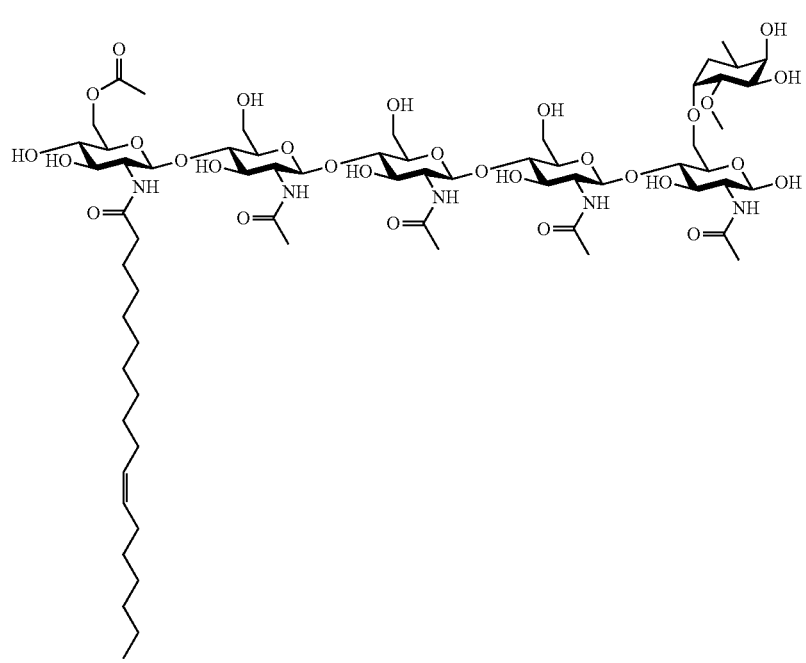
(VIII)
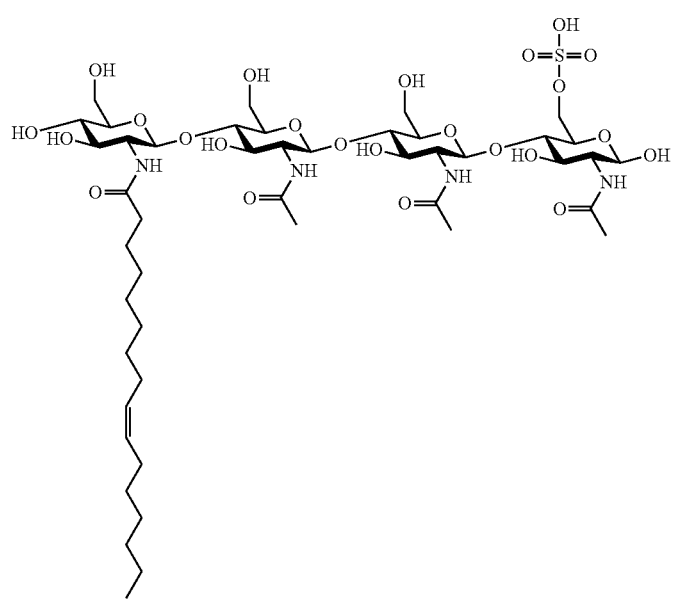
(IX)

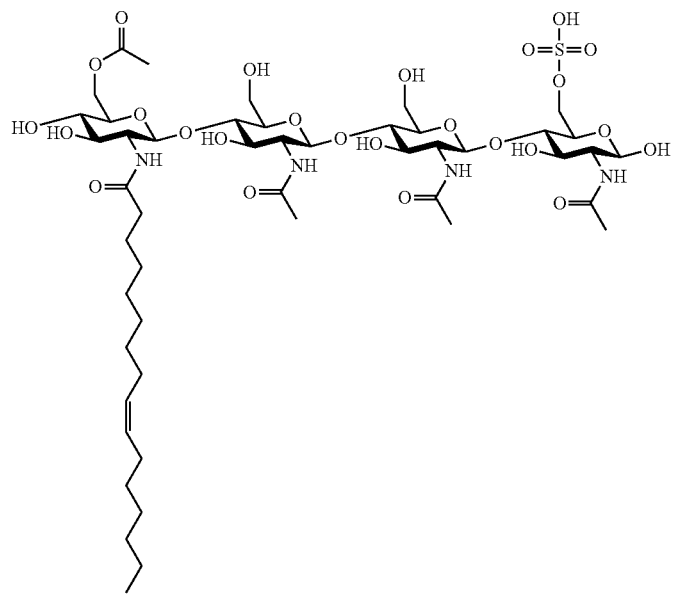
(X)
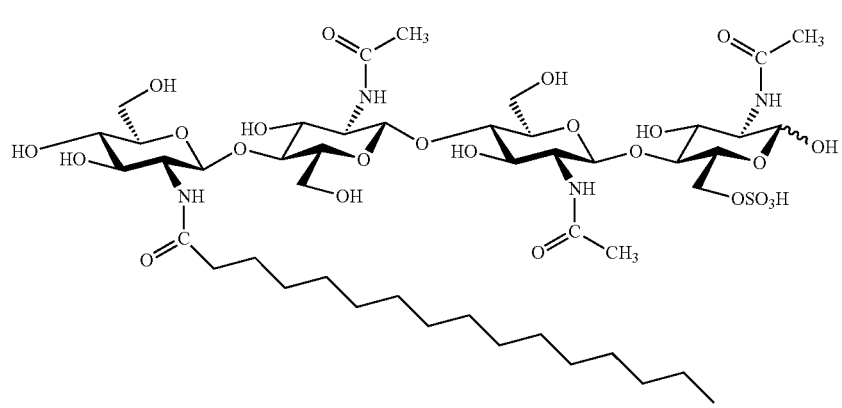
(XI)
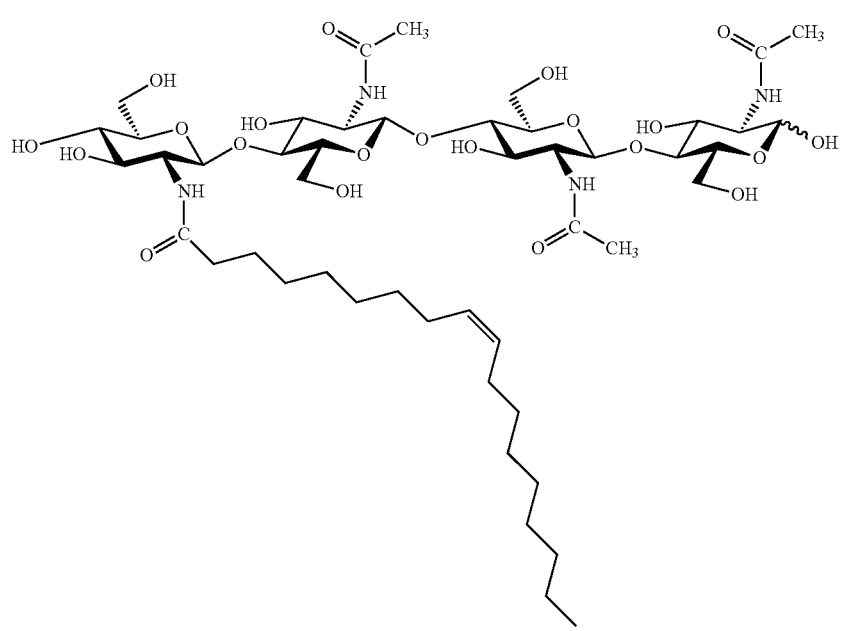
(XII)

-continued
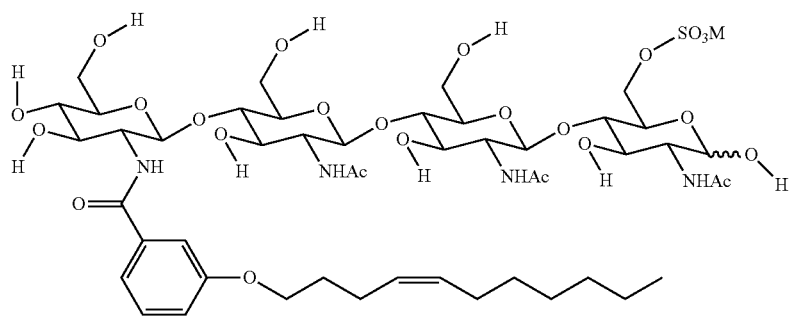
(XIII)
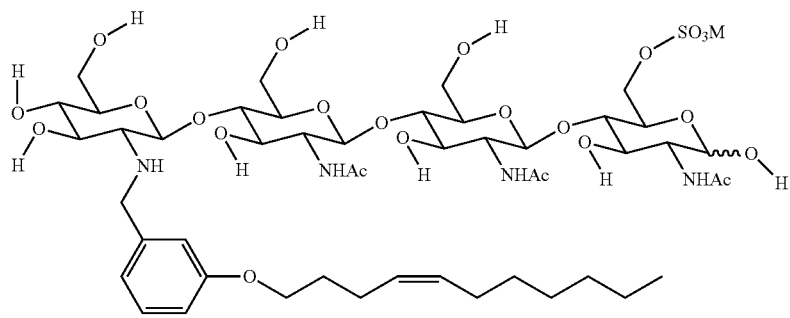
(XIV)
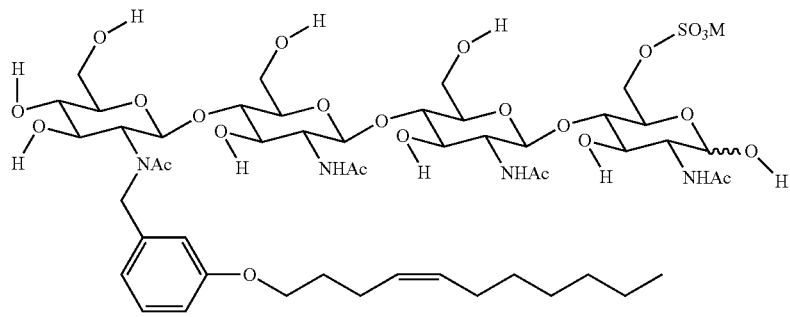
(XV)
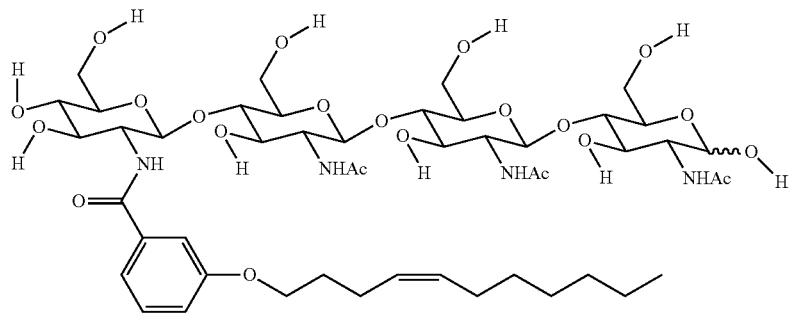
(XVI)
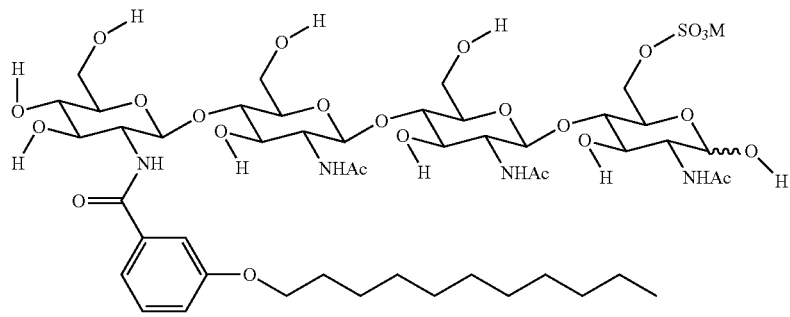
(XVII)

-continued
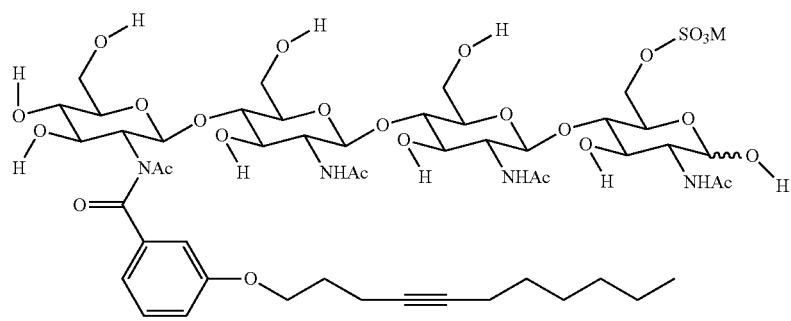
(XVIII)
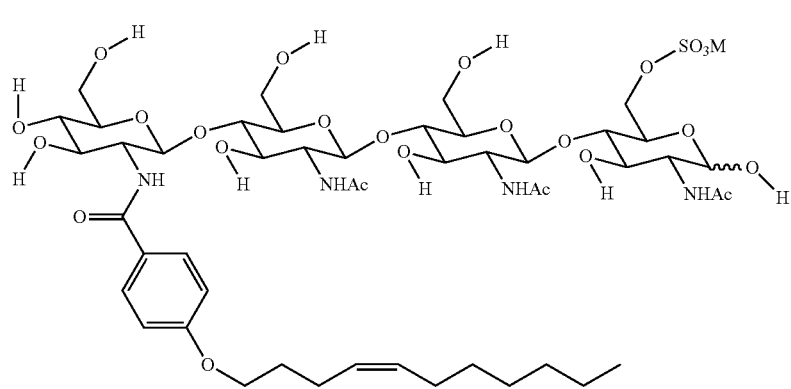
(XIX)
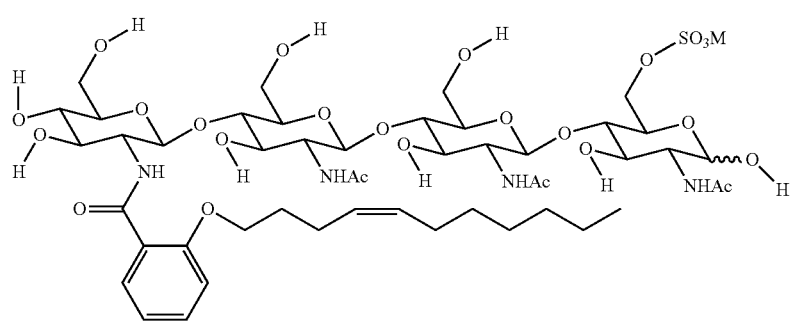
(XX)
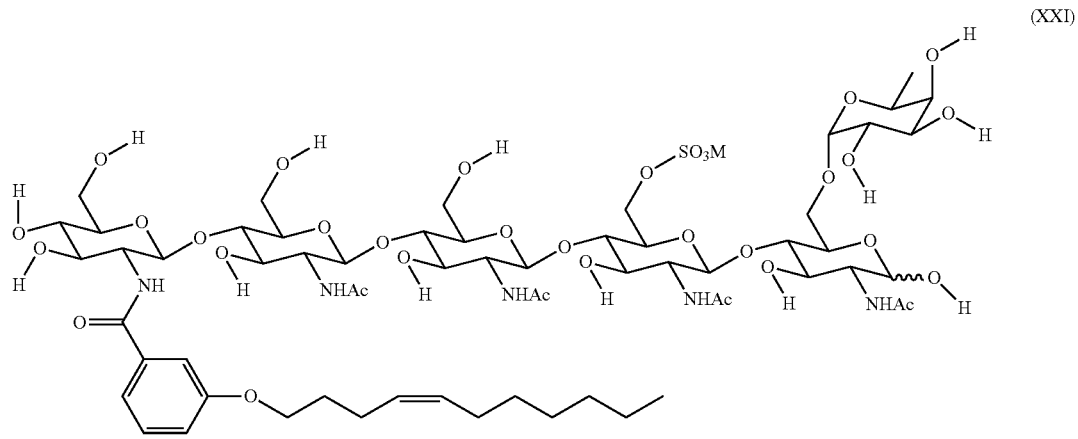
(XXI)

-continued
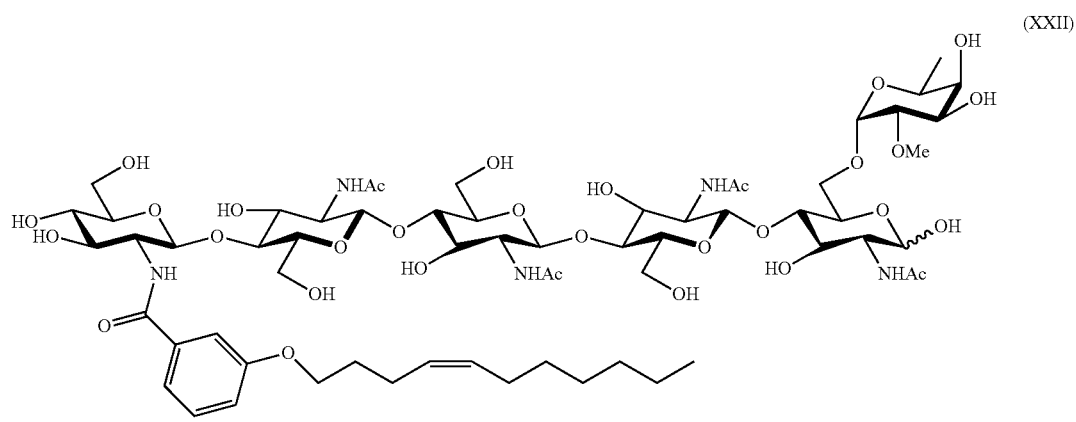
(XXII)
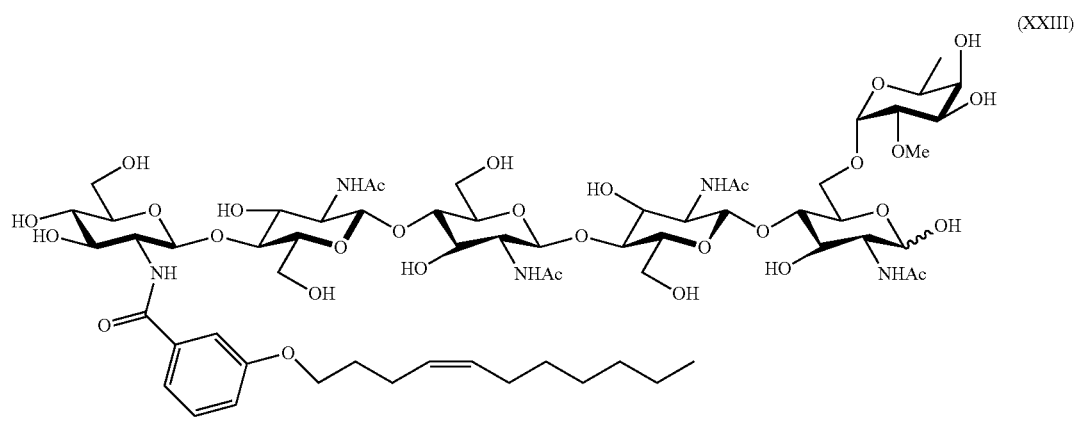
(XXIII)
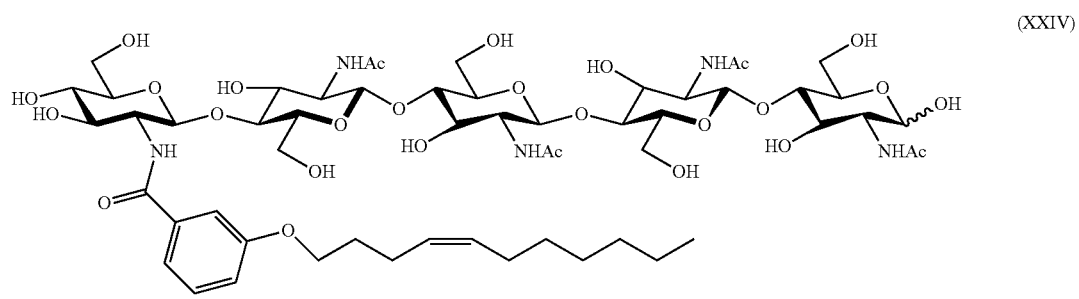
(XXIV)
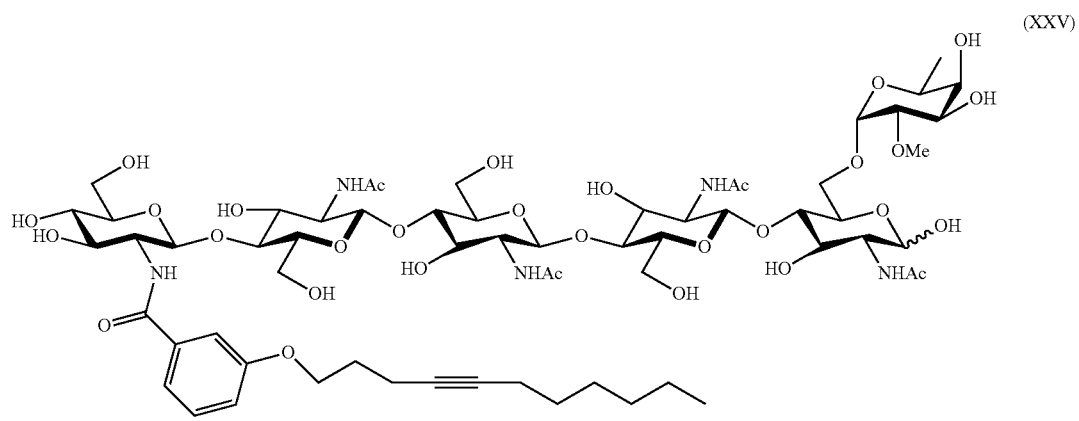
(XXV)

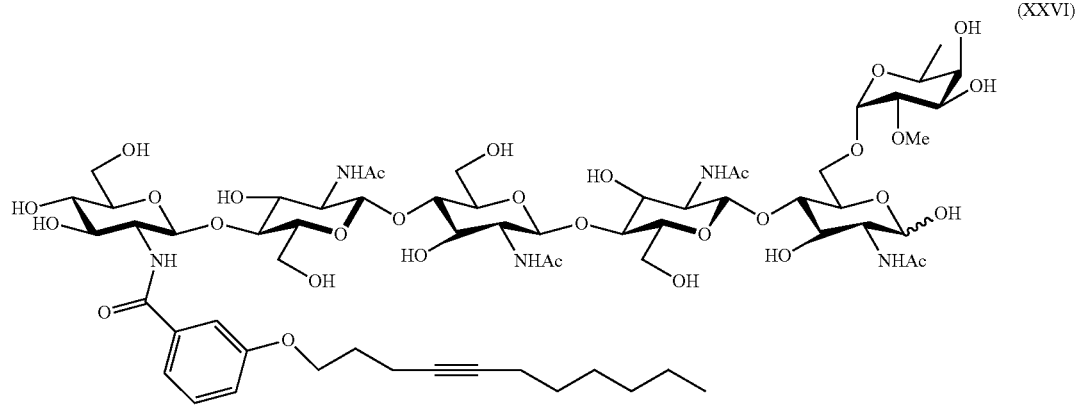
(XXVI)
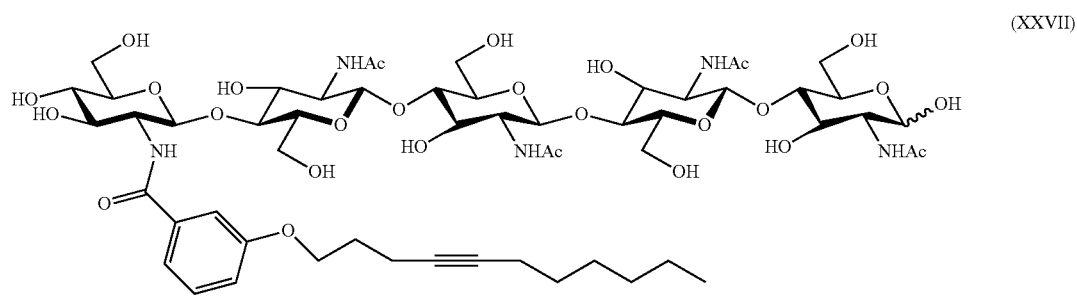
(XXVII)
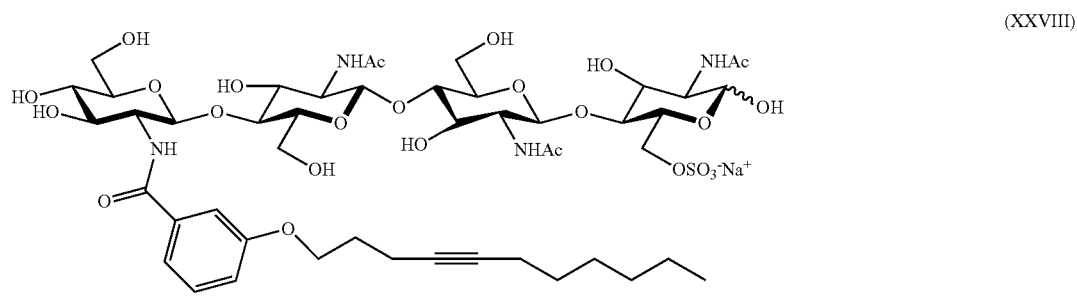
(XXVIII)
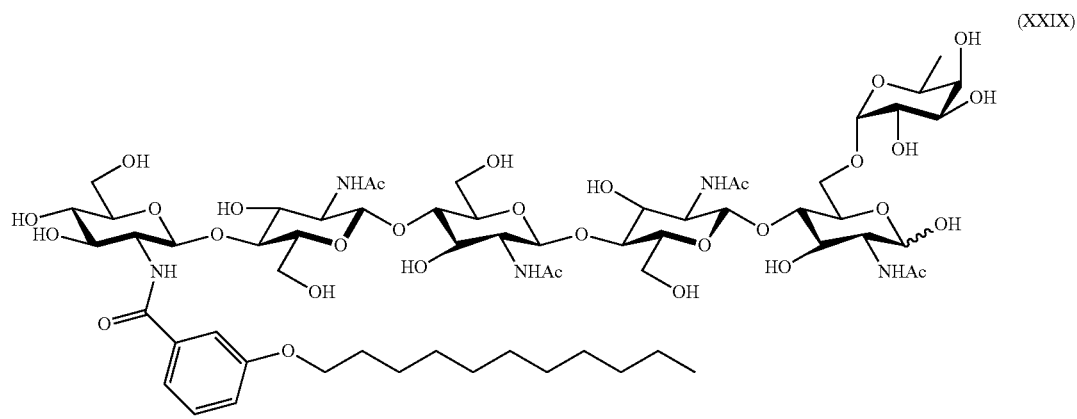
(XXIX)

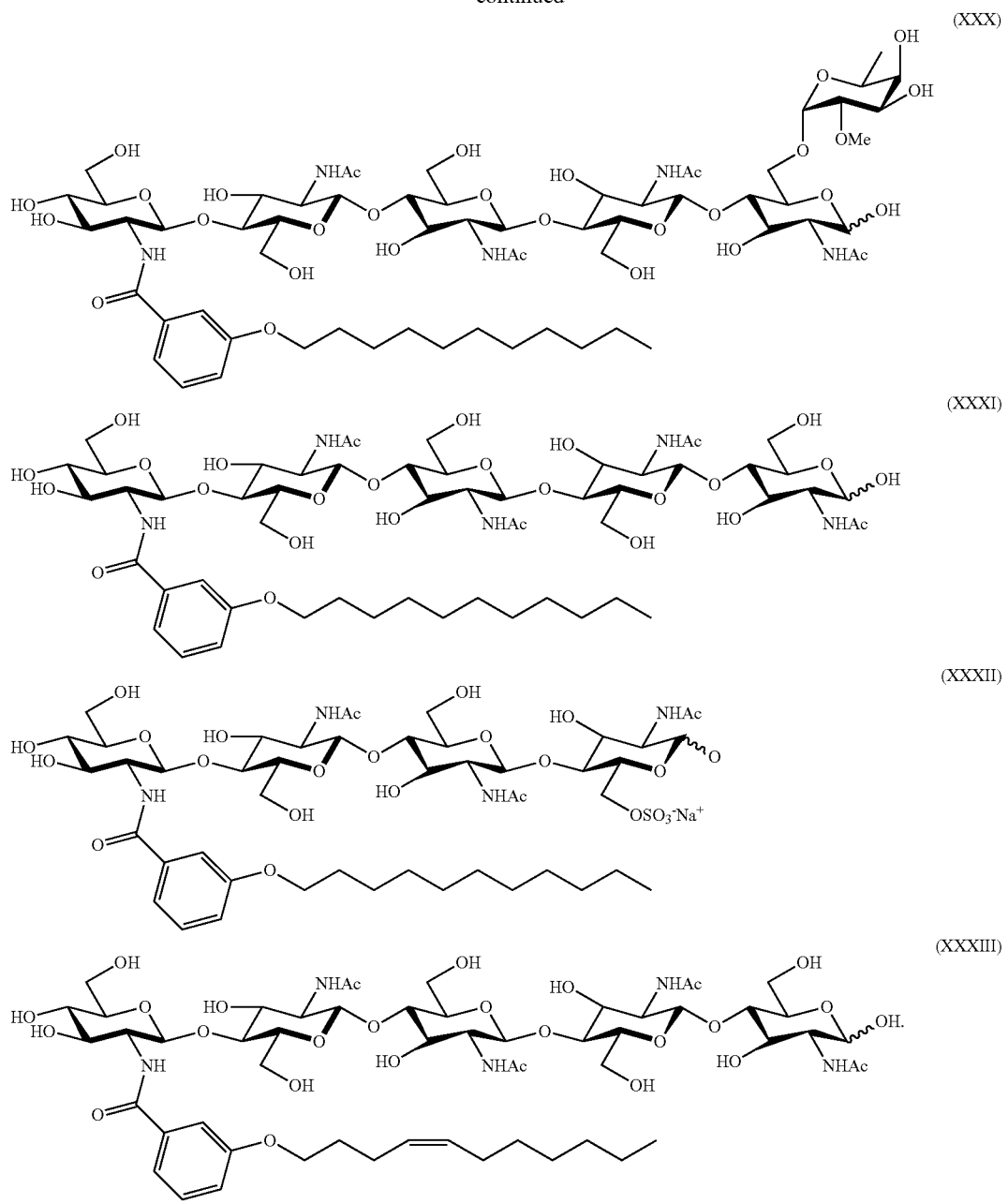

It is to be understood that compositions and methods of the present disclosure may comprise analogues, derivatives, hydrates, isomers, salts and/or solvates of LCOs.

Thus, in some embodiments, the first and/or second seed treatment compositions described herein comprise one, two, three, four, five, six, seven, eight, nine, ten, or more LCOs represented by one or more of formulas I-IV and/or structures V-XXXIII and/or one, two, three, four, five, six, seven, eight, nine, ten, or more analogues, derivatives, hydrates, isomers, salts and/or solvates of LCOs represented by one or more of formulas I-IV and/or structures V-XXXIII.

LCOs may be incorporated into the first and/or second seed treatment compositions described herein in any suitable amount(s)/concentration(s).

In some embodiments, the first and/or second seed treatment compositions described herein comprise about $1 \times 10^{-20}$ M to about $1 \times 10^{-1}$ M LCO. For example, the first and/or second seed treatment compositions described herein may comprise about $1 \times 10^{-20}$ M, $1 \times 10^{-19}$ M, $1 \times 10^{-18}$ M, $1 \times 10^{-17}$ M, $1 \times 10^{-16}$ M, $1 \times 10^{-15}$ M, $1 \times 10^{-14}$ M, $1 \times 10^{-13}$ M, $1 \times 10^{-12}$ M, $1 \times 10^{-11}$ M, $1 \times 10^{-10}$ M, $1 \times 10^{-9}$ M, $1 \times 10^{-8}$ M, $1 \times 10^{-7}$ M, $1 \times 10^{-6}$ M, $1 \times 10^{-5}$ M, $1 \times 10^{-4}$ M, $1 \times 10^{-3}$ M, $1 \times 10^{-2}$ M, $1 \times 10^{-1}$ M of one or more LCOs. In some embodiments, the LCO concentration is $1 \times 10^{-14}$ M to $1 \times 10^{-5}$ M, $1 \times 10^{-12}$ M to $1 \times 10^{-6}$ M, or $1 \times 10^{-10}$ M to $1 \times 10^{-7}$ M. In some embodiments, the LCO concentration is $1 \times 10^{-14}$ M to $1 \times 10^{-5}$ M, $1 \times 10^{-12}$ M to $1 \times 10^{-6}$ M, or $1 \times 10^{-10}$ M to $1 \times 10^{-7}$ M.

The first and/or second seed treatment compositions described herein may comprise any suitable CO(s).

COs, sometimes referred to as N-acetylchitooligosaccharides, are also composed of GlcNAc residues but have side chain decorations that make them different from chitin molecules [$(C_8H_{13}NO_5)_n$, CAS No. 1398-61-4] and chitosan molecules [$(C_5H_{11}NO_4)_n$, CAS No. 9012-76-4]. See, e.g., D'Haeze et al., PLANT PHYSIOL. 12 (6): 79R (2002); Demont-Caulet et al., PLANT PHYSIOL. 120 (1): 83 (1999); Hanel et al., PLANTA 232:787 (2010); Muller et al., PLANT PHYSIOL. 124:733 (2000); Robina et al., TETRAHEDRON 58:521-530 (2002); Rouge et al., *Docking of Chitin Oligomers and Nod Factors on Lectin Domains of the LysM-RLK Receptors in the Medicago-Rhizobium Symbiosis*, in THE MOLECULAR IMMUNOLOGY OF COMPLEX CARBOHYDRATES-3 (Springer Science, 2011); Van der Holst et al., CURR. OPIN. STRUC. BIOL. 11:608 (2001); and Wan et al., PLANT CELL 21:1053 (2009); PCT/FI00/00803 (2000). COs differ from LCOs in that they lack the pendant fatty acid chain that is characteristic of LCOs.

In some embodiments, inoculant compositions of the present disclosure comprise one or more COs represented by formula XXXIV:

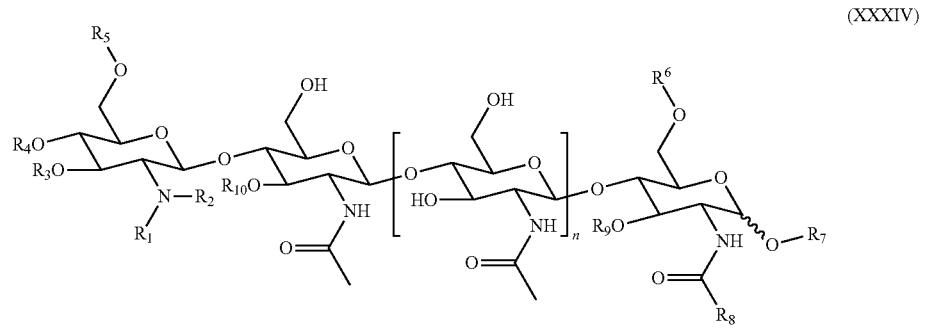

(XXXIV)

in which $R_1$ represents hydrogen or methyl; $R_2$ represents hydrogen or methyl; $R_3$ represents hydrogen, acetyl or carbamoyl; $R_4$ represents hydrogen, acetyl or carbamoyl; $R_5$ represents hydrogen, acetyl or carbamoyl; $R_6$ represents hydrogen, arabinosyl, fucosyl, acetyl, sulfate ester, 3-O—S-2-O-MeFuc, 2-O-MeFuc and 4-O-AcFuc; $R_7$ represents hydrogen, mannosyl or glycerol; $R_8$ represents hydrogen, methyl, or —$CH_2OH$; $R_9$ represents hydrogen, arabinosyl, or fucosyl; $R_{10}$ represents hydrogen, acetyl or fucosyl; and n represents 0, 1, 2 or 3.

COs included in compositions and methods of the present disclosure may be obtained from any suitable source.

In some embodiments, the CO is derived from an LCO. For example, in some embodiments, the first and/or second seed treatment compositions described herein comprise one or more COs derived from an LCO obtained (i.e., isolated and/or purified) from a strain of *Azorhizobium, Bradyrhizobium* (e.g., *B. japonicum*), *Mesorhizobium, Rhizobium* (e.g., *R. leguminosarum*), *Sinorhizobium* (e.g., *S. meliloti*), or mycorhizzal fungus (e.g., *Glomus intraradicus*). In some embodiments, the CO is derived from an LCO represented by one or more of formulas I-IV and/or structures V-XXXIII. Thus, in some embodiments, the first and/or second seed treatment compositions described herein may comprise one or more COs represented by one or more of formulas I-IV and/or structures V-XXXIII except that the pendant fatty acid is replaced with a hydrogen or methyl group.

In some embodiments, the CO is synthetic. Methods for the preparation of recombinant COs are known in the art. See, e.g., Cottaz et al., METH. ENG. 7 (4): 311 (2005); Samain et al., CARBOHYDRATE RES. 302:35 (1997); and Samain et al., J. BIOTECHNOL. 72:33 (1999).

Examples of COs (and derivatives thereof) that may be useful in compositions and methods of the present disclosure are provided below as formula XXXV:

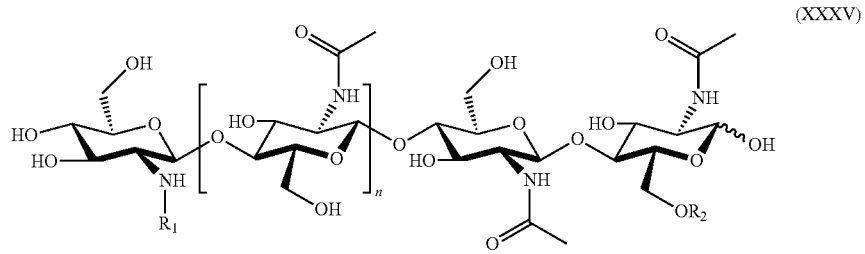

(XXXV)

in which n=1 or 2; $R_1$ represents hydrogen or methyl; and $R_2$ represents hydrogen or $SO_3H$.

Further examples of COs (and derivatives thereof) that may be useful in compositions and methods of the present disclosure are provided below as structures-XXXVI-XXXIX:

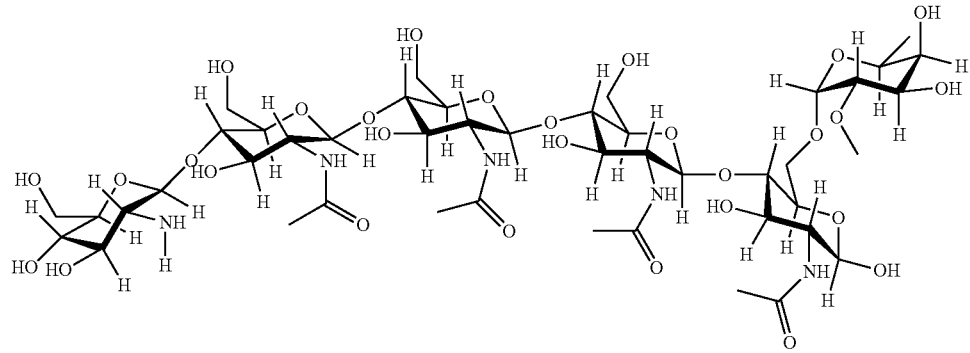

(XXXVI)

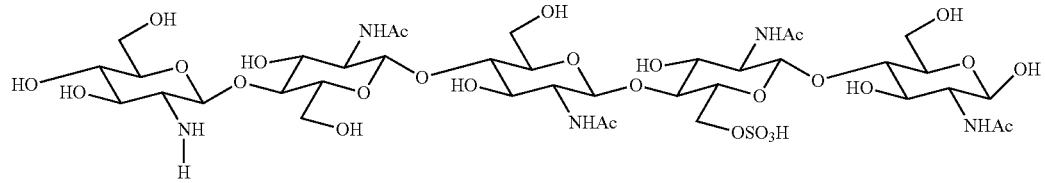

(XXXVII)

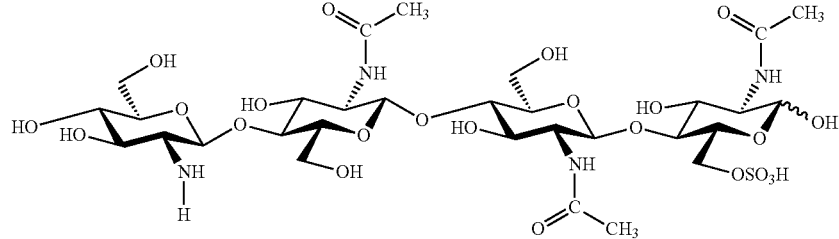

(XXXVIII)

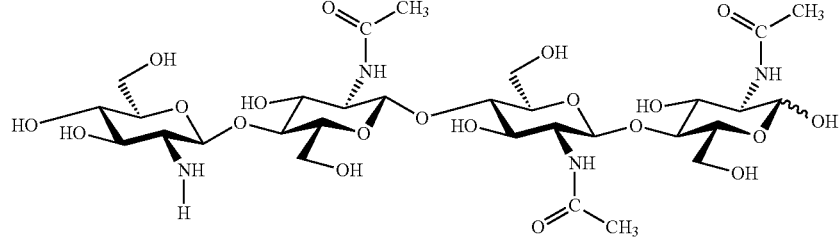

(XXXIX)

COs (and derivatives thereof) may be utilized in various forms of purity and may be used alone or in the form of a culture of CO-producing bacteria or fungi. In some embodiments, the CO(s) included in the first and/or second seed treatment compositions described herein is/are at least 70%, 75%, 80%; 85%, 90%, 91%, 92%, 93%, 94%, 95%, 96%, 97%, 98%, 99%, 99.5% or more pure.

It is to be understood that compositions and methods of the present disclosure may comprise hydrates, isomers, salts and/or solvates of COs.

Thus, in some embodiments, the first and/or second seed treatment compositions described herein comprise one, two, three, four, five, six, seven, eight, nine, ten, or more COs represented by one or more of formulas XXXIV-XXXV and/or structures XXXVI-XXXIX and/or one, two, three, four, five, six, seven, eight, nine, ten, or more analogues, derivatives, hydrates, isomers, salts and/or solvates of COs represented by one or more of formulas XXXIV-XXXV and/or structures XXXVI-XXXIX.

COs may be incorporated into the first and/or second seed treatment compositions described herein in any suitable amount(s)/concentration(s). In some embodiments, the first and/or second seed treatment compositions described herein comprise about $1\times10^{-20}$ M to about $1\times10^{-1}$ M CO. For example, the first and/or second seed treatment compositions described herein may comprise about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M of one or more COs. In some embodiments, the CO concentration is $1\times10^{-14}$ M to $1\times10^{-5}$ M, $1\times10^{-12}$ M to $1\times10^{-6}$ M, or $1\times10^{-10}$ M to $1\times10^{-7}$ M. In some embodiments, the CO concentration is $1\times10^{-14}$ M to $1\times10^{-5}$ M, $1\times10^{-12}$ M to $1\times10^{-6}$ M, or $1\times10^{-10}$ M to $1\times10^{-7}$ M.

The first and/or second seed treatment compositions described herein may comprise any suitable chitinous compound(s), including, but not limited to, chitin (IUPAC: N-[5-[[3-acetylamino-4,5-dihydroxy-6-(hydroxymethyl) oxan-2yl]methoxymethyl]-2-[[5-acetylamino-4,6-dihydroxy-2-(hydroxymethyl) oxan-3-yI]methoxymethyl]-4-hydroxy-6-(hydroxymethyl) oxan-3-ys]ethanamide), chitosan (IUPAC: 5-amino-6-[5-amino-6-[5-amino-4,6-dihydroxy-2 (hydroxymethyl) oxan-3-yl]oxy-4-hydroxy-2-(hydroxymethyl) oxan-3-yl]oxy-2 (hydroxymethyl) oxane-3,4-diol) and isomers, salts and solvates thereof.

Chitins and chitosans, which are major components of the cell walls of fungi and the exoskeletons of insects and crustaceans, are composed of GlcNAc residues.

Chitins and chitosans may be obtained commercially or prepared from insects, crustacean shells, or fungal cell walls. Methods for the preparation of chitin and chitosan are known in the art. See, e.g., U.S. Pat. No. 4,536,207 (preparation from crustacean shells) and U.S. Pat. No. 5,965,545 (preparation from crab shells and hydrolysis of commercial chitosan); Pochanavanich, et al., LETT. APPL. MICROBIOL. 35:17 (2002) (preparation from fungal cell walls).

Deacetylated chitins and chitosans may be obtained that range from less than 35% to greater than 90% deacetylation and cover a broad spectrum of molecular weights, e.g., low molecular weight chitosan oligomers of less than 15 kD and chitin oligomers of 0.5 to 2 kD; "practical grade" chitosan with a molecular weight of about 15 kD; and high molecular weight chitosan of up to 70 kD. Chitin and chitosan compositions formulated for seed treatment are commercially available. Commercial products include, for example, ELEXA® (Plant Defense Boosters, Inc.) and BEYOND™ (Agrihouse, Inc.).

The first and/or second seed treatment compositions described herein may comprise any suitable flavonoid(s), including, but not limited to, anthocyanidins, anthoxanthins, chalcones, coumarins, flavanones, flavanonols, flavans and isoflavonoids, as well as analogues, derivatives, hydrates, isomers, polymers, salts and solvates thereof.

Flavonoids are phenolic compounds having the general structure of two aromatic rings connected by a three-carbon bridge. Classes of flavonoids include are known in the art. See, e.g., Jain et al., J. PLANT BIOCHEM. & BIOTECHNOL. 11:1 (2002); Shaw et al., ENVIRON. MICROBIOL. 11:1867 (2006). Flavonoid compounds are commercially available, e.g., from Novozymes BioAg, Saskatoon, Canada; Natland International Corp., Research Triangle Park, NC; MP Biomedicals, Irvine, CA; LC Laboratories, Woburn MA. Flavonoid compounds may be isolated from plants or seeds, e.g., as described in U.S. Pat. Nos. 5,702,752; 5,990,291; and 6,146,668. Flavonoid compounds may also be produced by genetically engineered organisms, such as yeast, as described in Ralston et al., PLANT PHYSIOL. 137:1375 (2005).

In some embodiments, the first and/or second seed treatment compositions described herein comprise one or more anthocyanidins. For example, in some embodiments, the first and/or second seed treatment compositions described herein comprise cyanidin, delphinidin, malvidin, pelargonidin, peonidin and/or petunidin.

In some embodiments, the first and/or second seed treatment compositions described herein comprise one or more anthoxanthins. For example, in some embodiments, the first and/or second seed treatment compositions described herein comprise one or more flavones (e.g., apigenin, baicalein, chrysin, 7,8-dihydroxyflavone, diosmin, flavoxate, 6-hydroxyflavone, luteolin, scutellarein, tangeritin and/or wogonin) and/or flavonols (e.g., amurensin, astragalin, azaleatin, azalein, fisetin, furanoflavonols galangin, gossypetin, 3-hydroxyflavone, hyperoside, icariin, isoquercetin, kaempferide, kaempferitrin, kaempferol, isorhamnetin, morin, myricetin, myricitrin, natsudaidain, pachypodol, pyranoflavonols quercetin, quericitin, rhamnazin, rhamnetin, robinin, rutin, spiraeoside, troxerutin and/or zanthorhamnin).

In some embodiments, the first and/or second seed treatment compositions described herein comprise one or more flavanones. For example, in some embodiments, the first and/or second seed treatment compositions described herein comprise butin, eriodictyol, hesperetin, hesperidin, homoeriodictyol, isosakuranetin, naringenin, naringin, pinocembrin, poncirin, sakuranetin, sakuranin and/or sterubin.

In some embodiments, the first and/or second seed treatment compositions described herein comprise one or more flavanonols. For example, in some embodiments, the first and/or second seed treatment compositions described herein comprise dihydrokaempferol and/or taxifolin.

In some embodiments, the first and/or second seed treatment compositions described herein comprise one or more flavans. For example, in some embodiments, the first and/or second seed treatment compositions described herein comprise one or more flavan-3-ols (e.g., catechin (C), catechin 3-gallate (Cg), epicatechins (EC), epigallocatechin (EGC) epicatechin 3-gallate (ECg), epigallcatechin 3-gallate (EGCg), epiafzelechin, fisetinidol, gallocatechin (GC), gallcatechin 3-gallate (GCg), guibourtinidol, mesquitol, robinetinidol, theaflavin-3-gallate, theaflavin-3'-gallate, theflavin-3,3'-digallate, thearubigin), flavan-4-ols (e.g., apiforol and/or luteoforol) and/or flavan-3,4-diols (e.g., leucocyanidin, leucodelphinidin, leucofisetinidin, leucomalvidin, luecopelargonidin, leucopeonidin, leucorobinetinidin, melacacidin and/or teracacidin) and/or dimers, trimers, oligomers and/or polymers thereof (e.g., one or more proanthocyanidins).

In some embodiments, the first and/or second seed treatment compositions described herein comprise one or more isoflavonoids. For example, in some embodiments, the first and/or second seed treatment compositions described herein comprise one or more isoflavones (e.g, biochanin A, daidzein, formononetin, genistein and/or glycitein), isoflavanes (e.g., equol, ionchocarpane and/or laxifloorane), isoflavandiols, isoflavenes (e.g., glabrene, haginin D and/or 2-methoxyjudaicin), coumestans (e.g., coumestrol, plicadin and/or wedelolactone), pterocarpans and/or roetonoids.

The first and/or second seed treatment compositions described herein may comprise any suitable flavonoid derivative, including, but not limited to, neoflavonoids (e.g, calophyllolide, coutareagenin, dalbergichromene, dalbergin, nivetin) and pterocarpans (e.g., bitucarpin A, bitucarpin B, erybraedin A, erybraedin B, erythrabyssin II, erthyrabissin-1, erycristagallin, glycinol, glyceollidins, glyceollins, glycyrrhizol, maackiain, medicarpin, morisianine, orientanol, phaseolin, pisatin, striatine, trifolirhizin).

Flavonoids and derivatives thereof may be incorporated into inoculant compostions of the present disclosure in any suitable form, including, but not limited to, polymorphic and crystalline forms.

Flavonoids may be incorporated into the first and/or second seed treatment compositions described herein in any suitable amount(s)/concentration(s). The first and/or second seed treatment compositions described herein may comprise any suitable non-flavonoid node-gene inducer(s), including, but not limited to, jasmonic acid ([1R-[1α,2β(Z)]]-3-oxo-2-(pentenyl)cyclopentaneacetic acid; JA), linoleic acid ((Z,Z)-9,12-Octadecadienoic acid) and linolenic acid ((Z,Z,Z)-9,12,15-octadecatrienoic acid), as well as analogues, derivatives, hydrates, isomers, polymers, salts and solvates thereof.

Jasmonic acid and its methyl ester, methyl jasmonate (MeJA), collectively known as jasmonates, are octadecanoid-based compounds that occur naturally in some plants (e.g., wheat), fungi (e.g., *Botryodiplodia theobromae, Gibberella fujikuroi*), yeast (e.g., *Saccharomyces cerevisiae*) and bacteria (e.g., *Escherichia coli*). Linoleic acid and linolenic acid may be produced in the course of the biosynthesis of jasmonic acid. Jasmonates, linoleic acid and linolenic acid (and their derivatives) are reported to be inducers of nod gene expression or LCO production by rhizobacteria. See, e.g., Mabood, et al. PLANT PHYSIOL. BIOCHEM. 44 (11): 759 (2006); Mabood et al., AGR. J. 98 (2): 289 (2006); Mabood, et al., FIELD CROPS RES. 95 (2-3): 412 (2006); Mabood & Smith, *Linoleic and linolenic acid induce the expression of nod genes in Bradyrhizobium japonicum USDA 3*, PLANT BIOL. (2001).

Useful derivatives of jasmonic acid, linoleic acid, linolenic acid that may be useful in compositions of the present disclosure include esters, amides, glycosides and salts. Representative esters are compounds in which the carboxyl group of linoleic acid, linolenic acid, or jasmonic acid has been replaced with a —COR group, where R is an —OR$^1$ group, in which R$^1$ is: an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Representative amides are compounds in which the carboxyl group of linoleic acid, linolenic acid, or jasmonic acid has been replaced with a —COR group, where R is an NR$^2$R$^3$ group, in which R$^2$ and R$^3$ are independently: hydrogen; an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Esters may be prepared by known methods, such as acid-catalyzed nucleophilic addition, wherein the carboxylic acid is reacted with an alcohol in the presence of a catalytic amount of a mineral acid. Amides may also be prepared by known methods, such as by reacting the carboxylic acid with the appropriate amine in the presence of a coupling agent such as dicyclohexyl carbodiimide (DCC), under neutral conditions. Suitable salts of linoleic acid, linolenic acid and jasmonic acid include e.g., base addition salts. The bases that may be used as reagents to prepare metabolically acceptable base salts of these compounds include those derived from cations such as alkali metal cations (e.g., potassium and sodium) and alkaline earth metal cations (e.g., calcium and magnesium). These salts may be readily prepared by mixing together a solution of linoleic acid, linolenic acid, or jasmonic acid with a solution of the base. The salts may be precipitated from solution and be collected by filtration or may be recovered by other means such as by evaporation of the solvent.

Non-flavonoid node-gene inducers may be incorporated into the first and/or second seed treatment compositions described herein in any suitable amount(s)/concentration(s).

The first and/or second seed treatment compositions described herein may comprise karrakin(s), including, but not limited to, 2H-furo[2,3-c]pyran-2-ones, as well as analogues, derivatives, hydrates, isomers, polymers, salts and solvates thereof. In some embodiments, the inoculant composition comprises one or more karrakins represented by formula XL:

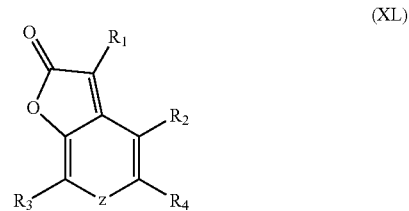

(XL)

in which Z is O, S or NR$_5$; R$_1$, R$_2$, R$_3$ and R$_4$ are each independently H, alkyl, alkenyl, alkynyl, phenyl, benzyl, hydroxy, hydroxyalkyl, alkoxy, phenyloxy, benzyloxy, CN, COR$_6$, COOR=, halogen, NR$_6$R$_7$, or NO$_2$; and R$_5$, R$_6$ and R$_7$ are each independently H, alkyl or alkenyl, or a biologically acceptable salt thereof.

Examples of biologically acceptable salts of karrakins may include acid addition salts formed with biologically acceptable acids, examples of which include hydrochloride, hydrobromide, sulphate or bisulphate, phosphate or hydrogen phosphate, acetate, benzoate, succinate, fumarate, maleate, lactate, citrate, tartrate, gluconate; methanesulphonate, benzenesulphonate and p-toluenesulphonic acid. Additional biologically acceptable metal salts may include alkali metal salts, with bases, examples of which include the sodium and potassium salts. Examples of compounds embraced by formula XXXX and which may be suitable for use in the present disclosure include 3-methyl-2H-furo[2,3-c]pyran-2-one (where R$_1$=CH$_3$, R$_2$, R$_3$, R$_4$=H), 2H-furo[2,3-c]pyran-2-one (where R$_1$, R$_2$, R$_3$, R4=H), 7-methyl-2H-furo[2,3-c]pyran-2-one (where R$_1$, R$_2$, R$_4$=H, R$_3$=CH$_3$), 5-methyl-2H-furo[2,3-c]pyran-2-one (where R$_1$, R$_2$, R$_3$=H, R$_4$=CH$_3$), 3,7-dimethyl-2H-furo[2,3-c]pyran-2-one (where R$_1$, R$_3$=CH$_3$, R$_2$, R$_4$=H), 3,5-dimethyl-2H-furo[2,3-c]pyran-2-one (where R$_1$, R$_4$=CH$_3$, R$_2$, R$_3$=H), 3,5,7-trimethyl-2H-furo[2,3-c]pyran-2-one (where R$_1$, R$_3$, R$_4$=CH$_3$, R$_2$=H), 5-methoxymethyl-3-methyl-2H-furo[2,3-c]pyran-2-one (where R$_1$=CH$_3$, R$_2$, R$_3$=H, R$_4$=CH$_2$OCH$_3$), 4-bromo-3,7-dimethyl-2H-furo[2,3-c]pyran-2-one (where R$_1$, R$_3$=CH$_3$, R$_2$=Br, R$_4$=H), 3-methylfuro[2,3-c]pyridin-2 (3H)-one (where Z=NH, R$_1$=CH$_3$, R$_2$, R$_3$, R$_4$=H) and 3,6-dimethylfuro[2,3-c]pyridin-2 (6H)-one (where Z=N—CH$_3$, R$_1$=CH$_3$, R$_2$, R$_3$, R$_4$=H). See, e.g., U.S. Pat. No. 7,576,213; Halford, *Smoke Signals*, in CHEM. ENG. NEWS (Apr. 12, 2010) (reporting that karrikins or butenolides contained in smoke act as growth stimulants and spur seed germination after a forest fire and can invigorate seeds such as corn, tomatoes, lettuce and onions that had been stored).

Karrakins may be incorporated into the first and/or second seed treatment compositions described herein in any suitable amount(s)/concentration(s).

The first and/or second seed treatment compositions described herein may comprise gluconolactone and/or one or more analogues, derivatives, hydrates, isomers, polymers, salts and/or solvates thereof.

Gluconolactone may be incorporated into the first and/or second seed treatment compositions described herein in any suitable amount(s)/concentration(s).

The first and/or second seed treatment composition may further comprise a non-active ingredient, for example a nutrient. In some embodiments, the first or second seed treatment composition further comprises a nutrient to maintain or extend the active lifespan of the biological agent. The processes described herein can be used to prepare treated seeds wherein the seed coating has a very low water content. The presence of a nutrient in the seed coating can be used to maintain the viability of the biological agent, including but not limited to bacteria, in such a low-water environment.

For example, the first or second seed treatment composition may comprise a sugar-based extender. For example, the sugar can comprise a saccharide (e.g., a disaccharide or polysaccharide) or a sugar alcohol. Non-limiting examples of suitable sugars include sucrose, maltose, lactose, lactulose, trehalose, cellobiose, chitobiose, turanose, xylobiose, starch, dextrin, cellulose, pectin, glycogen, chitin, arabitol, sorbitol, mannitol, xylitol, isomalt, erythritol, glycerol, maltitol, lactitol, galactitol, ribitol and inositol.

The first or second seed treatment composition may comprise a micronutrient. Without being bound to a particular theory, micronutrients added to the seed coating may help maintain the viability of the biological agent. Suitable micronutrients include, but are not limited to, elements such as S, K, Mg, Na, Se, Fe, Zn, Cu, Co, Mn, and Mo. In some embodiments, the polyvalent metal ions in the second seed treatment composition could provide dual functionality, by cross-linking the anionic polymer and also serving as micronutrients in the seed coating.

The first and/or second seed treatment composition may further comprise a non-active ingredient, for example a surfactant.

Examples of anionic surfactants include alkyl sulfates, alcohol sulfates, alcohol ether sulfates, alpha olefin sulfonates, alkylaryl ether sulfates, arylsulfonates, alkylsulfonates, alkylaryl sulfonates, sulfosuccinates, mono- or diphosphate esters of polyalkoxylated alkyl alcohols or alkyl phenols, mono- or disulfosuccinate esters of alcohols or polyalkoxylated alkanols, alcohol ether carboxylates, phenol ether carboxylates. In one embodiment, the surfactant is an alkylaryl sulfonate.

Non-limiting examples of commercially available anionic surfactants include sodium dodecylsulfate (Na-DS, SDS), MORWET D-425 (a sodium salt of alkyl naphthalene sulfonate condensate, available from Akzo Nobel), MORWET D-500 (a sodium salt of alkyl naphthalene sulfonate condensate with a block copolymer, available from Akzo Nobel), sodium dodecylbenzene sulfonic acid (Na-DBSA) (available from Sigma Aldrich), diphenyloxide disulfonate, naphthalene formaldehyde condensate, DOWFAX (available from Dow), dihexylsulfosuccinate, and dioctylsulfosuccinate, alkyl naphthalene sulfonate condensates, and salts thereof.

Examples of non-ionic surfactants include sorbitan esters, ethoxylated sorbitan esters, alkoxylated alkylphenols, alkoxylated alcohols, block copolymer ethers, and lanolin derivatives. In accordance with one embodiment, the surfactant comprises an alkylether block copolymer.

Non-limiting examples of commercially available non-ionic surfactants include SPAN 20, SPAN 40, SPAN 80, SPAN 65, and SPAN 85 (available from Sigma Aldrich); TWEEN 20, TWEEN 40, TWEEN 60, TWEEN 80, and TWEEN 85 (available from Sigma Aldrich); IGEPAL CA-210, IGEPAL CA-520, IGEPAL CA-720, IGEPAL CO-210, IGEPAL CO-520, IGEPAL CO-630, IGEPAL CO-720, IGEPAL CO-890, and IGEPAL DM-970 (available from Sigma Aldrich); TRITON X-100 (available from Sigma Aldrich); BRIJ S10, BRIJ S20, BRIJ 30, BRIJ 52, BRIJ 56, BRIJ 58, BRIJ 72, BRIJ 76, BRIJ 78, BRIJ 92V, BRIJ 97, and BRIJ 98 (available from Sigma Aldrich); PLURONIC L-31, PLURONIC L-35, PLURONIC L-61, PLURONIC L-81, PLURONIC L-64, PLURONIC L-121, PLURONIC 10R5, PLURONIC 17R4, and PLURONIC 31R1 (available from Sigma Aldrich); Atlas G-5000 and Atlas G-5002L (available from Croda); ATLOX 4912 and ATLOX 4912-SF (available from Croda); SOLUPLUS (available from BASF); LANEXOL AWS (available from Croda); TRITON AG-98 (available from Rohm and Haas Co.); and Silwet L-77 (available from Momentive).

Non-limiting examples of cationic surfactants include mono alkyl quaternary amine, fatty acid amide surfactants, amidoamine, imidazoline, and polymeric cationic surfactants.

The first and/or second seed treatment composition may comprise water. In some embodiments, the first and/or second seed treatment composition comprises a co-solvent in addition to water. Non-limiting examples of co-solvents that can be used include ethyl lactate, methyl soyate/ethyl lactate co-solvent blends (e.g., STEPOSOL, available from Stepan), isopropanol, acetone, 1,2-propanediol, n-alkylpyrrolidones (e.g., the AGSOLEX series, available from ISP), a petroleum based-oil (e.g., AROMATIC series and SOLVESSO series available from Exxon Mobil), isoparaffinic fluids (e.g. ISOPAR series, available from Exxon Mobil), cycloparaffinic fluids (e.g. NAPPAR 6, available from Exxon Mobil), mineral spirits (e.g. VARSOL series available from Exxon Mobil), and mineral oils (e.g., paraffin oil).

Examples of commercially available organic solvents include pentadecane, ISOPAR M, ISOPAR V, and ISOPAR L (available from Exxon Mobil).

In some embodiments, the first seed treatment composition is in the form of an aqueous slurry comprising one or more dispersed solid phases and a continuous aqueous phase. For example, the composition may be in the form of an aqueous suspension concentrate.

In other embodiments, the first seed treatment composition is in the form of an aqueous solution.

In some embodiments, the second seed treatment composition is in the form of an aqueous solution, wherein the polyvalent cations are incorporated into the composition in the form of a water-soluble salt.

Alternatively, the second seed treatment composition can be in the form of a slurry, or a suspension concentrate, having a solid dispersed phase.

Seeds and Plant Species

The seed treatment methods described herein can be used in connection with any species of plant and/or the seeds thereof. The methods are typically used in connection with seeds that are agronomically important. The seed may be a transgenic seed from which a transgenic plant can grow and incorporates a transgenic event that confers, for example, tolerance to a particular herbicide or combination of herbicides, increased disease resistance, enhanced tolerance to insects, drought, stress and/or enhanced yield. The seed may comprise a breeding trait, including for example, in one embodiment a disease tolerant breeding trait. In some instances, the seed includes at least one transgenic and breeding trait. The process can be used for the treatment of any suitable seed type, including, but not limited to, row crops and vegetables. In some embodiments, one or more plants are selected from Amaranthaceae (e.g., chard, spinach, sugar beet, *quinoa*), Asteraceae (e.g., artichoke, asters, chamomile, chicory, chrysanthemums, dahlias, daisies, *echinacea*, goldenrod, guayule, lettuce, marigolds, safflower, sunflowers, zinnias), Brassicaceae (e.g., arugula, broccoli, bok choy, Brussels sprouts, cabbage, cauliflower, canola, collard greens, daikon, garden cress, horseradish, kale, mustard, radish, rapeseed, rutabaga, turnip, wasabi, watercress, *Arabidopsis thaliana*), Cucurbitaceae (e.g., cantaloupe, cucumber, honeydew, melon, pumpkin, squash (e.g., acorn squash, butternut squash, summer squash), watermelon, zucchini), Fabaceae (e.g., alfalfa, beans, carob, clover, guar, lentils, mesquite, peas, peanuts, soybeans, tamarind, tragacanth, vetch), Malvaceae (e.g., cacao, cotton, durian, hibiscus, kenaf, kola, okra), Poaceae (e.g., bamboo, barley, corn, fonio, lawn grass (e.g., Bahia grass, Bermudagrass, bluegrass, Buffalograss, Centipede grass, Fescue, or *Zoysia*), millet, oats, ornamental grasses, rice, rye, sorghum, sugar cane, triticale, wheat), Polygonaceae (e.g., buckwheat), Rosaceae (e.g., almonds, apples, apricots, blackberry, blueberry, cherries, peaches, plums, quinces, raspberries, roses, strawberries), Solanaceae (e.g., bell peppers, chili peppers, eggplant, *petunia*, potato, tobacco, tomato) and Vitaceae (e.g., grape).

Non-limiting examples of seeds that may be treated with compositions of the present disclosure include plants sold by Monsanto Company (St. Louis, MO) under the BOLLGARD II®, DROUGHTGARD®, GENUITY®, RIB COMPLETE®, ROUNDUP READY®, ROUNDUP READY 2 YIELD®, ROUNDUP READY 2 EXTEND™, SMARTSTAX®, VT DOUBLE PRO®, VT TRIPLE PRO®, YIELDGARD®, YIELDGARD VT ROOTWORM/RR2®, YIELDGARD VT TRIPLE® and/or XTENDFLEX™ tradenames.

Application of the Seed Treatment Compositions

Typically, the seed is contacted with the first and second seed treatment compositions within a seed treatment apparatus. Suitable apparatuses and equipment for treating seeds are known in the art, and include, without limitation, batch treaters, continuous treaters, drum and pan coaters, and fluid bed coaters.

The seed treatment compositions can be applied to the seed by a variety of means, for example by a spray nozzle or revolving disc. In some instances, as the seed falls into the treatment apparatus, the seed is treated (for example by misting or spraying with the first seed treatment composition, followed by misting or spraying with the second seed treatment composition) and passed through the treater under continual movement, tumbling, and/or agitation.

For example, in some embodiments, the first seed treatment composition is applied to the seed by spraying. In some embodiments, the second seed composition is applied to the wetted seed by spraying.

Often, following application of the first seed treatment composition, it is desirable that the wetted seeds be dried or conditioned to ensure that they have an appropriate degree of surface wetness before application of the second seed treatment composition. This can be achieved, for example, by allowing the seeds to dwell in the seed treatment apparatus for a conditioning period following application of the first seed treatment composition. For example, the second seed treatment composition may be applied to the wetted seed after a conditioning period of from about 1 second to about 30 seconds, from about 2 seconds to about 20 seconds, or from about 3 seconds to about 10 seconds following the application of the first seed treatment composition.

In some embodiments, the second seed treatment composition is sprayed on the seed in an amount sufficient to achieve a high degree of crosslinking of the anionic polymer. For example, the degree of crosslinking may be at least about 50%, at least about 60%, at least about 70%, at least about 80%, at least about 90%, at least about 95%, at least about 97%, at least about 98%, or at least about 99%.

The second seed treatment composition can be sprayed on the wetted seed in an amount such that the polyvalent cations are present on the treated seed in molar excess relative to the number of crosslinking sites of the anionic polymer. For example, the molar ratio of polyvalent cations to crosslinking sites of the anionic polymer on the treated seed can be greater than 0.5:1, such as greater than about 1:1, greater than about 1.5:1, greater than about 2:1, greater than about 2.5:1, greater than about 3:1, or greater than about 4:1. In some embodiments, the molar ratio of polyvalent cations to crosslinking sites of the anionic polymer on the treated seed is from about 0.5:1 to about 4:1, from about 0.5:1 to about 3:1, from about 0.5:1 to about 2:1, from about 1:1 to about 4:1, from about 1:1 to about 3:1, from about 1:1 to about 2.5:1, from about 1:1 to about 2.25:1, or from about 1:1 to about 2:1.

When coating seed on a large scale (for example a commercial scale), the first seed treatment composition and/or second seed treatment composition may be applied using a continuous process, a batch process, or a semi-batch process.

Continuous Processes

When the first and second seed treatment compositions are applied (e.g., by spraying) to the seeds using a continuous process, the seed treatment apparatus comprises a continuous seed treater. For example, in some instances, the first and second seed treatment compositions are applied using a continuous process and the seed treatment apparatus comprises a horizontal cylindrical drum. During the seed treatment process, the seeds may be mixed by tumbling due to the rotating motion of the drum.

Batch Processes

Alternatively, the seed coating may be applied using a batch process. For example, a known weight of seeds can be introduced into the treatment equipment (such as a tumbler, a mixer, or a pan granulator). A known volume of the first seed treatment composition can be introduced into the treatment equipment at a rate that allows the seed treatment composition to be applied evenly over the seeds. During the application (e.g., application by spraying), the seed can be mixed, for example by spinning or tumbling. Subsequent application of the second seed treatment composition can be carried out in the same or similar manner.

When the first and second seed treatment compositions are applied to the seeds using a batch process, the seed treatment apparatus may comprise, for example, a batch treater. For example, in some instances, the first and second seed treatment compositions are applied using a batch process and the seed treatment apparatus comprises a rotating bowl seed treater. In other instances, the first and second seed treatment compositions are applied using a batch process and the seed treatment apparatus comprises a rotating drum treater.

In a further alternative embodiment, the first and second seed treatment compositions may be applied using a semi-batch process that incorporates features from each of the batch process and continuous process embodiments set forth above.

Treated Seeds

Another aspect of the present invention is directed to a treated seed. The treated seed may be prepared by a seed treatment process as described herein. For example, in some embodiments, the treated seed comprises a polymeric coating comprising a biological agent and/or an agrochemical as described herein.

The biological agent may be at least partially encapsulated in the pores of the polymeric coating. In some embodiments, the biological agent may exhibit improved activity. In some embodiments, the biological agent may exhibit an extended lifespan.

In some embodiments, the treated seed comprises a polymeric coating that is substantially uniform.

The methods described herein may be used to produce treated seeds having a thin film coating. For example, the treated seed may comprise a polymeric coating having a thickness of less than about 50 μm, less than about 40 μm, less than about 30 μm, less than about 25 μm, less than about 20 μm, less than about 15 μm, less than about 10 μm, less than about 9 μm, less than about 8 μm, less than about 7 μm, less than about 6 μm, or even less than about 5 μm.

In some embodiments, the treated seed exhibits a high degree of flowability.

In some embodiments, the treated seed exhibits a high degree of plantability.

In some embodiments, the treated seed exhibits a low degree of dust-off.

Having described the invention in detail, it will be apparent that modifications and variations are possible without departing from the scope of the invention defined in the appended claims.

EXAMPLES

The following non-limiting examples are provided to further illustrate the present invention.

Example 1: Viability Testing for Treated Seeds with Non-Spore Former Microbes Such as *Bradyrhizobium, Pseudomonas* and Others In this example, soy seeds are treated using sodium alginate, sugar-based extender, and non-spore former microbes, followed by treatment with a solution of calcium chloride to cross-link the alginate on the seed coat. Experiments are performed using different non-spore former strains.

Into a commercial bowl seed treater, 1 kg of soy seeds are added. The seed treater is turned on to start the initial treatment with liquid inoculum, sugar-based extender, and sodium alginate. Inoculum, sugar-based extender, and alginate solutions are either pre-mixed and applied or co-applied separately at time 0-5 seconds. After 10 seconds, 6% calcium chloride aqueous solution is applied to cross-link the alginate on the seed coat. The treater is stopped at 35 seconds and the seeds are dropped into a paper bag.

TABLE 1A

Experimental Methods

| | Method 1 | Method 2 | Method 3 | Application Rate (mL/kg of seed) | Loading | Stoichiometry (Moles of G&M-units/cwt seed) |
|---|---|---|---|---|---|---|
| Apply @ 0-5 Seconds | 2% Alginate in Tap Water | 3.5% Alginate in Tap Water | 5% Alginate in Tap Water | 3 | 0.01-0.02 mg/seed | $1 \times 10^{-9}$ to $3 \times 10^{-9}$ |
| | Inoculum | Inoculum | Inoculum | 2-4 | $1.0 \times 10^6$ cfu/seed | |

| | Method 1 | Method 2 | Method 3 | Application Rate (mL/kg of seed) | Loading | Stoichiometry (Moles of CaCl$_2$/cwt seed) |
|---|---|---|---|---|---|---|
| Apply @ 10-15 Seconds | 6% CaCl$_2$ in Tap Water | 6% CaCl$_2$ in Tap Water | 6% CaCl$_2$ in Tap Water | 2 | 0.02 mg/seed | $4 \times 10^{-9}$ |

Stop the run at 35 seconds; Calculations based on 300,000 seeds/100 lb weight (cwt)

Figure 2:
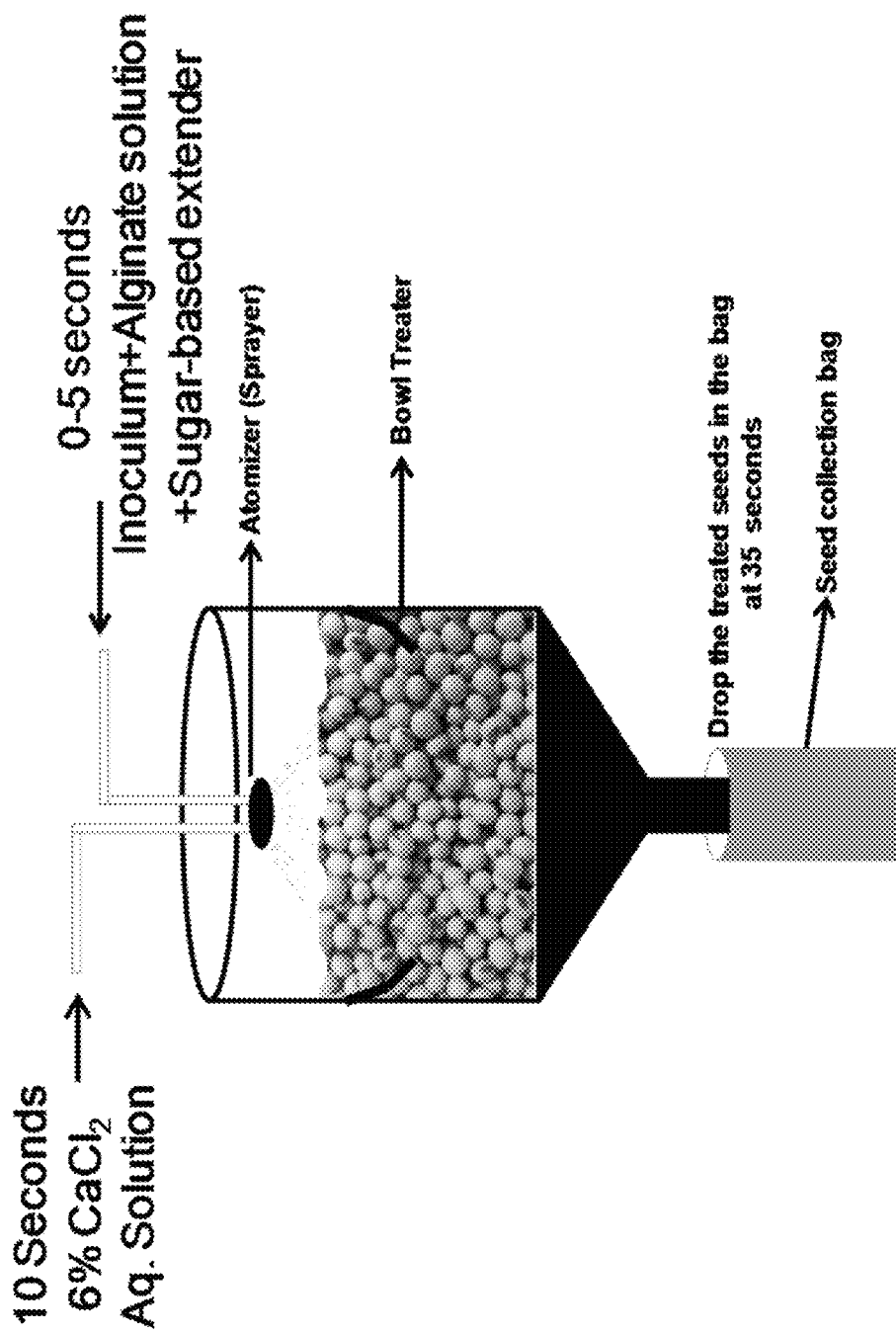
FIG. 2 is a schematic diagram of the seed treatment procedure used in Example 1.

The term "G&M-units" refer to repeat units of mannuric and guluronic acids which form the alginate polymer The treatment procedure is shown in the schematic diagram depicted in FIG. 2. A list of sample treatment compositions prepared for a given strain is provided in FIG. 4. The treatment procedures were repeated for each strain.

Example 2: Non-Spore Former Microbes Survivability on Treated Seeds

Treated seeds prepared using the procedures described in Example 3 are stored at 25° C. and 50% relative humidity in an environmental chamber to study the survivability of non-spore former microbes on the treated seed surface. Treated seeds are analyzed at 4 hours after the treatment, and then at each week for a period of 4 weeks or more. A schematic diagram of the seed treater is depicted in FIG. 2.

Example 3: In-Situ Partial Encapsulation of Non-Spore Former Microbes on Soy Seed Coat Using Alginate in Combination with a Sugar-Based Extender and Commercial Pesticides In this example, soy seeds are treated sequentially in 3 steps with: (1) pesticides, (2) *Bradyrhizobium* inoculum, sugar-based extender and alginate, and (3) a solution of calcium chloride to cross-link alginate over the seed coat.

Experiments are performed using 3 different non-spore microbes, including *Bradyrhizobium*.

Into a commercial bowl seed treater, 1 kg of soy seeds are added. The seed treater is turned on to start the mixing and pesticides are applied between 0-5 seconds. Then between 10-15 seconds, a second application of inoculum, sugar-based extender and alginate solutions are applied. Inoculum, sugar-based extender, and alginate solutions are either pre-mixed and applied or co-applied separately. At 20-25-seconds, 6% calcium chloride aqueous solution is applied to cross-link the alginate over the seed coat. The treater is stopped at 40 seconds and the seeds are dropped into a paper bag.

The chemistry blend used in the seed treatment compositions is described in Table 3A. Sample seed treatment compositions are listed in Table 3B.

TABLE 3A

| | Chemistry Blend: | | | |
|---|---|---|---|---|
| | Product | Active | Slurry Application Rate (mL/kg of seed) | mg/seed |
| Apply @ 0-5 Seconds | Apron-XL, 33.3% | Mefenoxam | 41.72 | 0.023 |
| | Maxim 4FS, 40.3% | Fludioxonil | 10.43 | 0.008 |
| | Cruiser 5FS, 47.6% | Thiamethoxam | 83.44 | 0.077 |
| | Color Coat red | — | 52.15 | — |
| | Polymer for controls only | | 65.19** | — |
| | Water | | 7.82 | — |

**Replace this with water for non-poymer runs

TABLE 3B

| | Method 1 | Method 2 | Method 3 | Application Rate (mL/kg of seed) | Loading | Stoichiometry (Moles of G&M-units/cwt seed) |
|---|---|---|---|---|---|---|
| Apply @ 10-15 Seconds | 2% Alginate in Tap Water | 3.5% Alginate in Tap Water | 5% Alginate in Tap Water | 3 | 0.01-0.02 mg/seed | $1 \times 10^{-9}$ to $3 \times 10^{-9}$ |
| | Inoculum | Inoculum | Inoculum | 2-4 | $1.0 \times 10^6$ cfu/seed | |

| | Method 1 | Method 2 | Method 3 | Application Rate (mL/kg of seed) | Loading | Stoichiometry (Moles of $CaCl_2$/cwt seed) |
|---|---|---|---|---|---|---|
| Apply @ 20-25 Seconds | 6% $CaCl_2$ in Tap Water | 6% $CaCl_2$ in Tap Water | 6% $CaCl_2$ in Tap Water | 2 | 0.02 mg/seed | $4 \times 10^{-9}$ |

Stop the run at 40 seconds; Calculations based on 300,000 seeds/100 lb weight (cwt)

Figure 3:
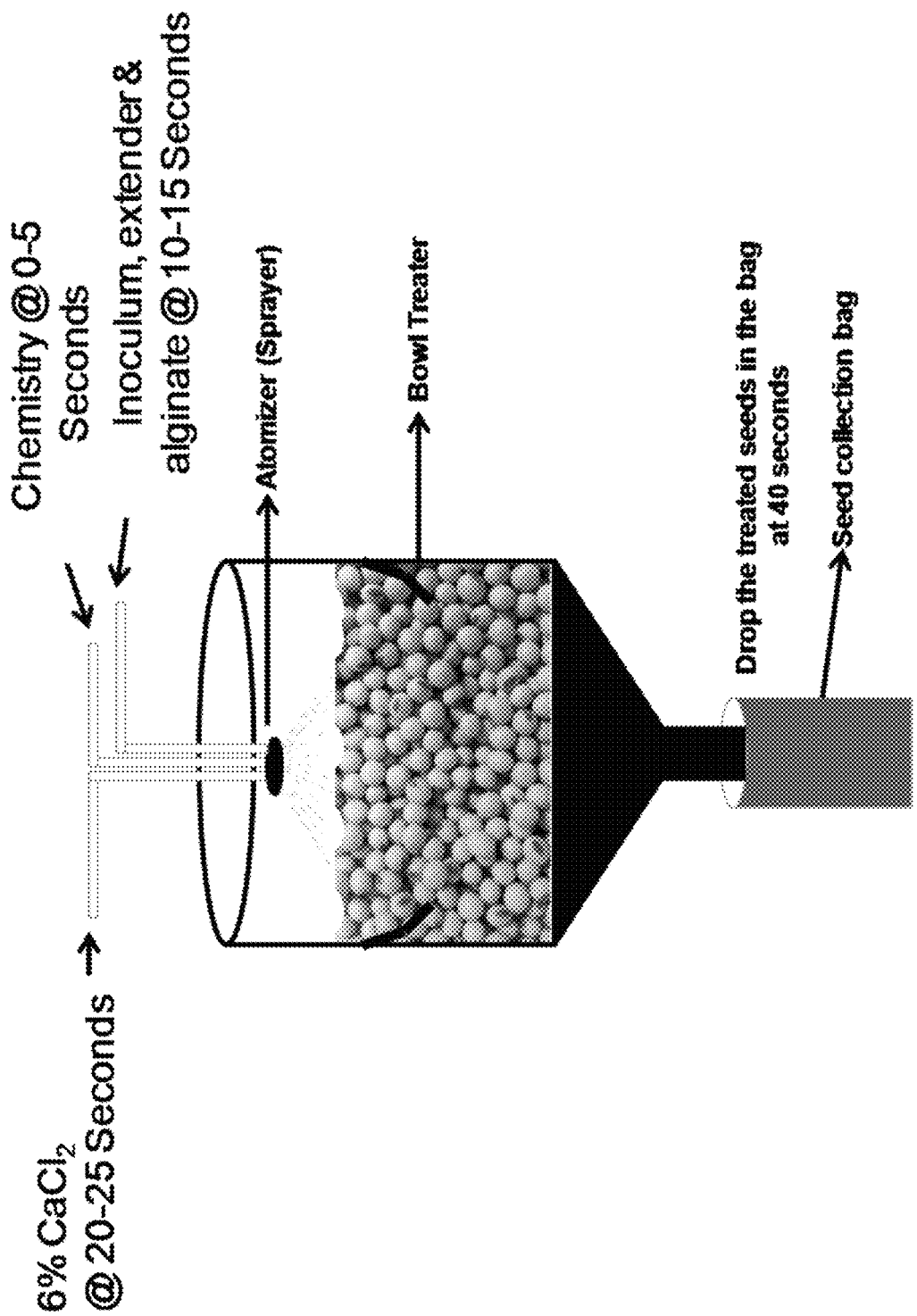
FIG. 3 is a schematic diagram of the seed treatment procedure used in Example 3.

The term "G&M-units" refer to repeat units of mannuric and guluronic acids which form the alginate polymer The treatment procedure is shown in the schematic diagram depicted in FIG. 3. A list of sample treatment compositions prepared for a given inoculum strain is provided in Table 3C.

Example 4: Non-Spore Former Microbes Survivability when Applied with Chemical Insecticides and Fungicides on Treated Seeds Treated seeds prepared using the procedures described in Example 1 are stored at 25° C. and 50% relative humidity in an environmental chamber to study the survivability of the non-spore former strains on the seed surface. Treated seeds are analyzed at 4 hours after the treatment, and then at each week for a period of 4 weeks or more.

Example 5: Seed Characteristics

Seeds are treated at 5-kg scale using a commercial batch treater. Treated seeds with and without alginate are evaluated for seed characteristics to measure improvements using alginate methodology over the conventional treatments.
Treatment Protocol:
Commercial products containing insecticides and fungicides and a polymer are used for the seed treatment as shown in FIG. 6
Plantability:
Plantability is one of the key parameters to evaluate treated seed quality to ensure the treated seeds perform well in the commercial planting equipment. The plantability tests are performed using two different pieces of equipment: a KINZE brush-type seed meter (mechanical) and a JOHN DEERE [JD] Vacuum Meter (pneumatic).

Planter tests are performed first without additives, and then with talc and graphite additives in the hopper. In addition, tests are conducted at both standard temperature and humidity and at a higher humidity level (65-70%), which represents more challenging conditions for seed planting.

The planted seeds are then evaluated to determine how many were successfully planted. Each planting location having a single planted seed is deemed to be successful; planting locations having either no seeds or multiple seeds are deemed to be unsuccessful.
Dust Level:
Dust generation experiments are performed on a Type I HEUBACH Dust meter. A sample of treated seeds (100 g) of a known seed size is added to a metallic drum having a 40 liter dry air volume. The seeds are tumbled inside the drum at a rotation speed of 30 RPM. While the seeds are tumbling, air is pulled through the drum at a rate of 20 L/min, which is then passed through a larger collection chamber followed by glass fiber filter paper. The amount of dust on the filter paper is measured using an analytical balance and used to calculate the amount of dust generated per 100 k seeds.
Flowability:
The flowability of the seeds is measured using an FT4 powder rheometer. The FT4 powder rheometer is used to measure the basic flowable energy (BFE) of each sample. BFE refers to the energy (in mJ) required to turn and move the probe through a column of the seeds, and is a measure of the flowability of the seeds. The less energy required to complete the test, the better (more easily) the seeds flow.
Phytotoxicity:
Phytotoxicity is one of the key parameters to evaluate the treated seed quality. Phytotoxicity is evaluated using warm germination. A warm germination test for soy and corn is performed at 25° C. for 7 days using rolled towel media. At the conclusion of the test, the roots are evaluated for normal and abnormal root growth and for dead seeds.

EMBODIMENTS

For further illustration, additional non-limiting embodiments of the present invention are set forth below.

For example, embodiment 1 is a method of producing a treated seed having a polymeric coating, the method comprising:
  applying a first seed treatment composition comprising an anionic polymer and a biological agent to a seed, thereby producing a wetted seed; and
  spraying the wetted seed with a second seed treatment composition comprising one or more polyvalent cations.

Embodiment 2 is the method of embodiment 1 wherein the biological agent is selected from the group consisting of bacteria, fungi, beneficial nematodes, and viruses.

Embodiment 3 is the method of embodiment 2 wherein the biological agent comprises a bacterium.

Embodiment 4 is the method of embodiment 3 wherein the biological agent comprises a bacterium of the genus Actinomycetes, *Agrobacterium, Arthrobacter, Alcaligenes, Aureobacterium, Azobacter, Bacillus, Beijerinckia, Bradyrhizobium, Brevibacillus, Burkholderia, Chromobacterium, Clostridium, Clavibacter, Comamonas, Corynebacterium, Curtobacterium, Enterobacter, Flavobacterium, Gluconobacter, Hydrogenophaga, Klebsiella, Methylobacterium, Paenibacillus, Pasteuria, Photorhabdus, Phyllobacterium, Pseudomonas, Rhizobium, Serratia, Sphingobacterium, Stenotrophomonas, Streptomyces, Variovorax*, or *Xenorhabdus*.

Embodiment 5 is the method of embodiment 4 wherein the biological agent comprises a bacterium of the genus *Bradyrhizobium*.

Embodiment 6 is the method of embodiment 3 wherein the biological agent comprises a bacterium selected from the group consisting of *Bacillus amyloliquefaciens, Bacillus cereus, Bacillus firmus, Bacillus, licheniformis, Bacillus pumilus, Bacillus sphaericus, Bacillus subtilis, Bacillus thuringiensis, Bradyrhizobium japonicum, Chromobacterium subtsugae, Pasteuria nishizawae, Pasteuria penetrans, Pasteuria usage, Pseudomonas fluorescens*, and *Streptomyces lydicus*.

Embodiment 7 is the method of embodiment 6 wherein the biological agent comprises *Bradyrhizobium japonicum*.

Embodiment 8 is the method of any one of embodiments 1 to 7 wherein the biological agent comprises a fungus of the genus *Alternaria, Ampelomyces, Aspergillus, Aureobasidium, Beauveria, Colletotrichum, Coniothyrium, Gliocladium, Metarhizium, Muscodor, Paecilomyces, Trichoderma, Typhula, Ulocladium*, and *Verticillium*.

Embodiment 9 is the method of any one of embodiments 1 to 8 wherein the biological agent comprises a plant growth activator or plant defense agent selected from the group consisting of harpin, *Reynoutria sachalinensis*, jasmonate, lipochitooligosaccharides, and isoflavones.

Embodiment 10 is the method of any one of embodiments 1 to 9 wherein the anionic polymer comprises an anionic polysaccharide.

Embodiment 11 is the method of embodiment 10 wherein the anionic polysaccharide comprises an alginate.

Embodiment 12 is the method of embodiment 11 wherein the alginate is in the form of a water-soluble salt.

Embodiment 13 is the method of embodiment 12 wherein the anionic polysaccharide comprises sodium alginate or potassium alginate.

Embodiment 14 is the method of any one of embodiments 1 to 13 wherein the second seed treatment composition comprises one or more divalent cations.

Embodiment 15 is the method of embodiment 14 wherein the divalent cations are selected from the group consisting of aluminum, antimony, barium, calcium, cobalt, copper, iron, magnesium, nickel, tin, titanium, vanadium, and zinc Embodiment 16 is the method of embodiment 15 wherein the divalent cations comprise divalent calcium ions.

Embodiment 17 is the method of embodiment 14 wherein the divalent cations comprise one or more polyamines.

Embodiment 18 is the method of embodiment 17 wherein the polyamines are selected from the group consisting of spermine, putrescine and spermidine.

Embodiment 19 is the method of any one of embodiments 1 to 18 wherein the second seed treatment composition comprises polyvalent cations in the form of a salt.

Embodiment 20 is the method of embodiment 19 the second seed treatment composition comprises calcium chloride.

Embodiment 21 is the method of any one of embodiments 1 to 20 wherein the second seed treatment composition comprises a nutrient.

Embodiment 22 is the method of embodiment 21 wherein said nutrient comprises a sugar.

Embodiment 23 is the method of any one of embodiments 1 to 22 wherein the method further comprises applying an additional component to the seed.

Embodiment 24 is the method of embodiment 23 wherein the first seed treatment composition comprises the additional component.

Embodiment 25 is the method of embodiment 23 wherein the second seed treatment composition comprises the additional component.

Embodiment 26 is the method of any one of embodiments 23 to 25 wherein the additional component comprises an agrochemical.

Embodiment 27 is the method of embodiment 26 wherein the additional component comprises a pesticide.

Embodiment 28 is the method of embodiment 27 wherein the additional component comprises an insecticide, a nematicide, a fungicide, or a mixture thereof.

Embodiment 29 is the method of embodiment 28 wherein the additional component comprises one or more insecticides or nematicides selected from the group consisting of abamectin, aldicarb, aldoxycarb, bifenthrin, carbofuran, chlorantraniliprole, clothianidin, cyantraniliprole, cyfluthrin, cyhalothrin, cypermethrin, deltamethrin, dinotefuran, emamectin, ethiprole, fenamiphos, fipronil, flubendiamide, fluopyram, fosthiazate, imidacloprid, ivermectin, lambdacyhalothrin, milbemectin, tioxazafen, nitenpyram, oxamyl, permethrin, spinetoram, spinosad, spirodiclofen, spirotetramat, tefluthrin, thiacloprid, thiamethoxam, tioxazafen, and thiodicarb.

Embodiment 30 is the method of embodiment 28 wherein the additional component comprises an insecticide or nematicide selected from the group consisting of clothianidin, thiamethoxam, tioxazafen, imidacloprid and combinations thereof.

Embodiment 31 is the method of embodiment 30 wherein the additional component comprises tioxazafen.

Embodiment 32 is the method of embodiment 28 wherein the additional component comprises a fungicide selected from the group consisting of acibenzolar-S-methyl, azoxystrobin, benalaxyl, bixafen, boscalid, carbendazim, chlorothalonil, cyproconazole, dimethomorph, epoxiconazole, fludioxonil, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothiconazole, pyraclostrobin, sedaxane, silthiofam, tebuconazole, thiabendazole, thifluzamide, thiophanate, tolclofos-methyl, trifloxystrobin, and triticonazole.

Embodiment 33 is the method of embodiment 28 wherein the additional component comprises a fungicide selected from the group consisting of prothioconazole, fluoxastrobin, ipconazole, silthiofam, metalaxyl, trifloxystrobin, pyraclostrobin, fluxapyroxad, sedaxane, fluopyram, mefenoxam, penflufen, and azoxystrobin.

Embodiment 34 is the method of any one of embodiments 23 to 33 wherein the additional component comprises a pesticide selected from the group consisting of fluxapyroxad, ipconazole, metalaxyl, penflufen, pyraclostrobin, trifloxystrobin, abamectin, *Bacillus firmus*, clothianidin, imidacloprid, thiamethoxam and mixtures thereof.

Embodiment 35 is the method of any one of embodiments 23 to 34 wherein the additional component comprises a surfactant.

Embodiment 36 is the method of embodiment 35 wherein the additional component comprises an anionic surfactant.

Embodiment 37 is the method of embodiment 36 wherein the anionic surfactant is selected from the group consisting of alkyl sulfates, alcohol sulfates, alcohol ether sulfates, alpha olefin sulfonates, alkylaryl ether sulfates, arylsulfonates, alkylsulfonates, alkylaryl sulfonates, sulfosuccinates, mono- or diphosphate esters of polyalkoxylated alkyl alcohols or alkyl phenols, mono- or disulfosuccinate esters of alcohols or polyalkoxylated alkanols, alcohol ether carboxylates, and phenol ether carboxylates.

Embodiment 38 is the method of embodiment 37 wherein the anionic surfactant comprises an alkylaryl sulfonate.

Embodiment 39 is the method of embodiment 35 wherein the additional component comprises a nonionic surfactant.

Embodiment 40 is the method of embodiment 39 wherein the nonionic surfactant is selected from the group consisting of sorbitan esters, ethoxylated sorbitan esters, alkoxylated alkylphenols, alkoxylated alcohols, block copolymer ethers, and lanolin derivatives.

Embodiment 41 is the method of embodiment 40 wherein the nonionic surfactant comprises an alkylether block copolymer.

Embodiment 42 is the method of embodiment 35 wherein the additional component comprises a cationic surfactant.

Embodiment 43 is the method of embodiment 42 wherein the cationic surfactant is selected from the group consisting of mono alkyl quaternary amine, fatty acid amide surfactants, amidoamine, imidazoline, and polymeric cationic surfactants.

Embodiment 44 is the method of any one of embodiments 23 to 43 wherein the additional component comprises a co-solvent.

Embodiment 45 is the method of embodiment 44 wherein the co-solvent is selected from the group consisting of ethyl lactate, methyl soyate/ethyl lactate co-solvent blends, isopropanol, acetone, 1,2-propanediol, n-alkylpyrrolidones, petroleum based-oils, isoparaffinic fluids, cycloparaffinic fluids, mineral spirits, and mineral oils.

Embodiment 46 is the method of any one of embodiments 23 to 45 wherein the additional component comprises a biopesticide.

Embodiment 47 is the method of embodiment 46 wherein the additional component comprises a biofungicide, a bioinsecticide, or a bionematicide.

Embodiment 48 is the method of any one of embodiments 1 to 47 wherein the second seed treatment composition is applied to the wetted seed after a conditioning period of from about 1 second to about 30 seconds, from about 2 seconds to about 20 seconds, or from about 3 seconds to about 10 seconds following the application of the first seed treatment composition.

Embodiment 49 is the method of any one of embodiments 1 to 48 wherein the treated seeds are produced using a continuous process.

Embodiment 50 is the method of embodiment 49 wherein the first seed treatment composition is applied to the seed within a seed treatment apparatus comprising a horizontal cylindrical drum.

Embodiment 51 is the method of any one of embodiments 1 to 48 wherein the wetted seeds are produced using a batch process.

Embodiment 52 is the method of embodiment 51 wherein the first seed treatment composition is applied to the seed within a seed treatment apparatus comprising a rotating bowl seed treater.

Embodiment 53 is the method of any one of embodiments 1 to 52 wherein the second seed treatment composition is sprayed on the wetted seed in an amount sufficient to achieve a degree of crosslinking of the anionic polymer on the treated seed of at least about 50%, at least about 60%, at least about 70%, at least about 80%, at least about 90%, at least about 95%, at least about 97%, at least about 98%, or at least about 99%.

Embodiment 54 is the method of any one of embodiments 1 to 53 wherein the second seed treatment composition is sprayed on the wetted seed in an amount such that the polyvalent cations are present in molar excess relative to the number of crosslinking sites of the anionic polymer on the treated seed.

Embodiment 55 is the method of embodiment 54 wherein the second seed treatment composition is sprayed on the wetted seed in an amount such that the molar ratio of polyvalent cations to crosslinking sites of the anionic polymer on the treated seed is greater than about 0.5:1, greater than about 1:1, greater than about 1.5:1, greater than about 2:1, greater than about 2.5:1, greater than about 3:1, or greater than about 4:1.

Embodiment 56 is the method of embodiment 54 wherein the second seed treatment composition is sprayed on the wetted seed in an amount such that the molar ratio of polyvalent cations to crosslinking sites of the anionic polymer on the treated seed is from about 0.5:1 to about 4:1, from about 0.5:1 to about 3:1, from about 0.5:1 to about 2:1, from about 1:1 to about 4:1, from about 1:1 to about 3:1, from about 1:1 to about 2.5:1, from about 1:1 to about 2.25:1, or from about 1:1 to about 2:1.

Embodiment 57 is a treated seed having a polymeric coating produced according to the method of any one of embodiments 1 to 56.

Embodiment 58 is a treated seed comprising a polymeric coating and a biological agent,
wherein the biological agent is at least partially encapsulated within the pores of the polymeric coating,
and wherein the coating has a thickness of less than about 50 µm.

Embodiment 59 is the treated seed of embodiment 57 or 58 wherein the polymeric coating has a thickness of less than about 40 µm, less than about 30 µm, less than about 25 µm, less than about 20 µm, less than about 15 µm, less than about 10 µm, less than about 9 µm, less than about 8 µm, less than about 7 µm, less than about 6 µm, or even less than about 5 µm.

When introducing elements of the present invention or the embodiments(s) thereof, the articles "a", "an", "the" and "said" are intended to mean that there are one or more of the elements. The terms "comprising", "including" and "having" are intended to mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawing[s] shall be interpreted as illustrative and not in a limiting sense.

What is claimed is:

1. A method of producing a treated seed having a polymeric coating, the method comprising:
    applying a first seed treatment composition comprising an anionic polymer and a biological agent selected from the group consisting of bacteria, fungi, beneficial nematodes and viruses to a seed, thereby producing a wetted seed; and
    spraying the wetted seed with a second seed treatment composition comprising one or more divalent metal cations, wherein the second seed treatment composition is applied to the wetted seed after a conditioning period of from about 1 second to about 30 seconds following the application of the first seed treatment composition.

2. The method of claim 1 wherein the biological agent is a beneficial nematode.

3. The method of claim 1 wherein the biological agent is a bacterium.

4. The method of claim 1 wherein the biological agent is a fungus of the genus *Alternaria, Ampelomyces, Aspergillus, Aureobasidium, Beauveria, Colletotrichum, Coniothyrium, Gliocladium, Metarhizium, Muscodor, Paecilomyces, Trichoderma, Typhida, Ulocladium*, and *Verticillium*.

5. The method of claim 1 wherein the first seed treatment further comprises a plant growth activator or plant defense agent selected from the group consisting of harpin, *Reynoutria sachalinensis*, jasmonate, lipochitooligosaccharides, and isoflavones.

6. The method of claim 1 wherein the anionic polymer comprises an anionic polysaccharide and the anionic polysaccharide comprises sodium alginate or potassium alginate.

7. The method of claim 1 wherein the second seed treatment composition comprises divalent calcium ions.

8. The method of claim 1 wherein the second seed treatment composition comprises the divalent metal cations in the form of a salt.

9. The method of claim 1 wherein the second seed treatment composition further comprises a nutrient.

10. The method of claim 9 wherein said nutrient comprises a sugar.

11. The method of claim 1 wherein the method further comprises applying an additional component to the seed.

12. The method of claim 11 wherein the additional component comprises an agrochemical.

13. The method of claim 12 wherein the additional component comprises an insecticide, a nematicide, a fungicide, or a mixture thereof.

14. The method of claim 11 wherein the additional component comprises a surfactant.

15. The method of claim 11 wherein the additional component comprises a co-solvent.

16. The method of claim 11 wherein the additional component comprises a biofungicide, a bioinsecticide, or a bionematicide.

17. The method of claim 1 wherein the second seed treatment composition is applied to the wetted seed after a conditioning period of from about 2 seconds to about 20 seconds following the application of the first seed treatment composition.

18. The method of claim 1 wherein the second seed treatment composition is sprayed on the wetted seed in an amount sufficient to achieve a degree of crosslinking of the anionic polymer on the treated seed of at least 50%.

19. The method of claim 1 wherein the second seed treatment composition is sprayed on the wetted seed in an amount such that the divalent metal cations are present in molar excess relative to the number of crosslinking sites of the anionic polymer on the treated seed.

20. The method of claim 1 wherein the second seed treatment composition is sprayed on the wetted seed in an amount such that the molar ratio of divalent metal cations to crosslinking sites of the anionic polymer on the treated seed is greater than 0.5:1.

21. The method of claim 3 wherein the bacterium is of the genus *Bradyrhizobium, Burkholderia, Klebsiella, Photorhabdus, Serratia, Pseudomonas, Variovorax,* or *Xenorhabdus*.

* * * * *